United States Patent [19]
Kondo et al.

[11] Patent Number: 5,754,692
[45] Date of Patent: May 19, 1998

[54] PICTURE COINCIDENCE DETECTING APPARATUS AND METHOD

[75] Inventors: Tetsujiro Kondo; Takashi Horishi, both of Kanagawa, Japan

[73] Assignee: Sony Corporation, Tokyo, Japan

[21] Appl. No.: 411,771

[22] PCT Filed: Jul. 28, 1994

[86] PCT No.: PCT/JP94/01246

§ 371 Date: Apr. 20, 1995

§ 102(e) Date: Apr. 20, 1995

[87] PCT Pub. No.: WO95/04329

PCT Pub. Date: Feb. 9, 1995

[30] Foreign Application Priority Data

Jul. 31, 1993 [JP] Japan .................. 5-208474

[51] Int. Cl.$^6$ .................................. G06K 9/68
[52] U.S. Cl. ......................... 382/216; 382/227
[58] Field of Search ................... 382/216, 227, 382/278, 209

[56] References Cited

U.S. PATENT DOCUMENTS

| | | | |
|---|---|---|---|
| 4,486,775 | 12/1984 | Catlow | 382/216 |
| 4,972,499 | 11/1990 | Kurosawa | 382/227 |
| 5,040,223 | 8/1991 | Kamiya et al. | 382/227 |
| 5,105,467 | 4/1992 | Kim et al. | 382/227 |
| 5,488,674 | 1/1996 | Burt et al. | 382/284 |
| 5,557,684 | 9/1996 | Wang et al. | 382/236 |

FOREIGN PATENT DOCUMENTS

| | | |
|---|---|---|
| 2-255990 | 10/1990 | Japan . |
| 4-345394 | 12/1992 | Japan . |

OTHER PUBLICATIONS

Remote Sensing: Economic Tool for the Nineties, Vancouver, Jul. 10–14, 1989, vol. 3, Jul. 10, 1989 Institute of Electrical and Electronics Engineers, pp. 1283–1286, XP 000139268 Kastak W D et al. 'A Two–Stage Algorithm For Registration of Remotely Sensed Images'.
Proceedings of the Third International Conference On Computer Vision, Osaka (JP), Dec. 4–7, 1990; IEEE (New York), pp. 485–488, XP 000242641 Subhodev Das et al. 'Multi-resolution image acquisition and surface reconstruction' p. 487.

*Primary Examiner*—Leo Boudreau
*Assistant Examiner*—Christopher Kelley
*Attorney, Agent, or Firm*—Frommer Lawrence & Haug LLP; William S. Frommer

[57] ABSTRACT

Lower accuracy picture coincidence detecting means gives positional relationship between picture data of higher resolution picture and lower resolution picture as corresponding pixel position predicted with marker position as reference, i.e., initial position. Block matching processing means sets a search range corresponding to a block of an arbitrary range set within the lower resolution picture in accordance with the initial position to globally search, within the search range, block on the higher resolution picture corresponding to the block of the arbitrary range to find out a candidate of coincidence area to further interpolate between respective pixels of lower resolution picture and higher resolution picture to thereby evaluate, with high accuracy, similarity between the set block and block within the search range to detect a picture in which coincidence is obtained. For this reason, even if corresponding pictures are pictures such that both pixel positions differ from each other in dependency upon pictures of different formats, e.g., different picture angles, it is possible to detect coincidence between pictures or pixels.

16 Claims, 18 Drawing Sheets

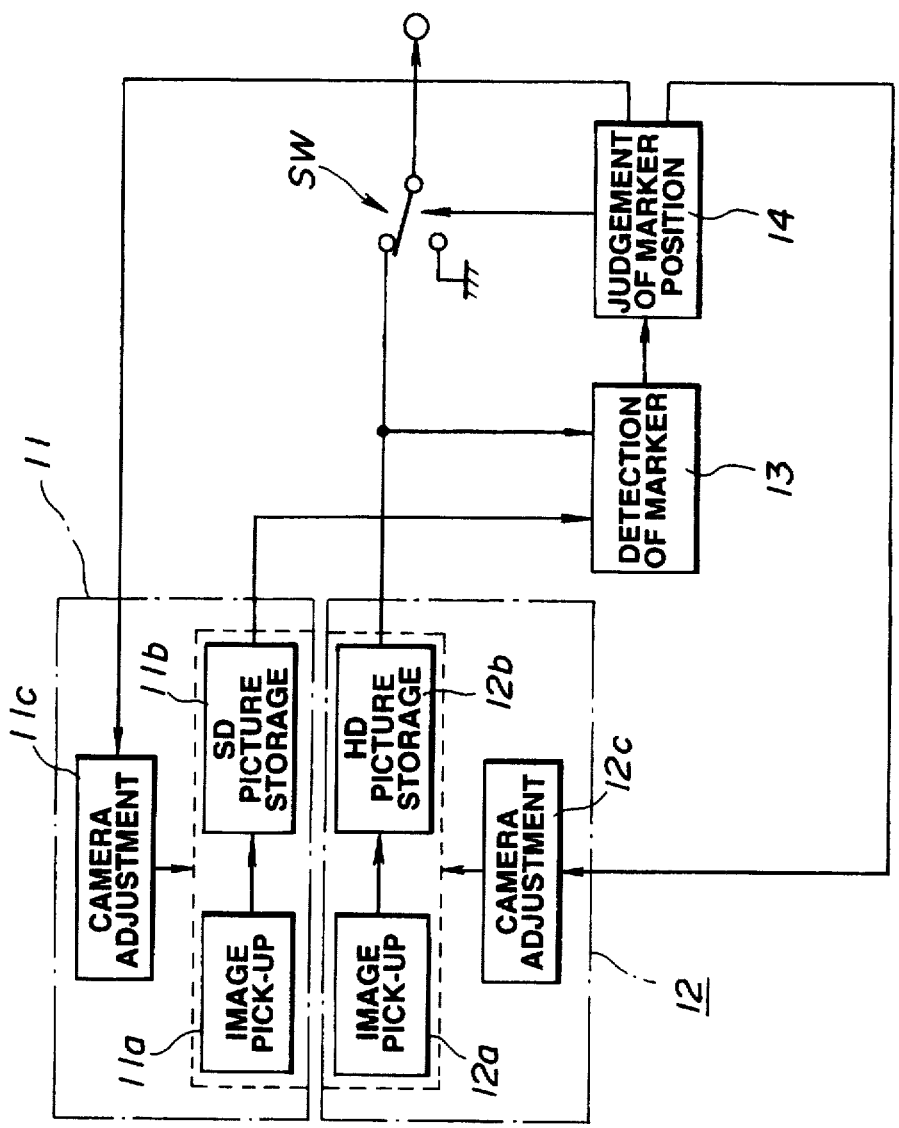
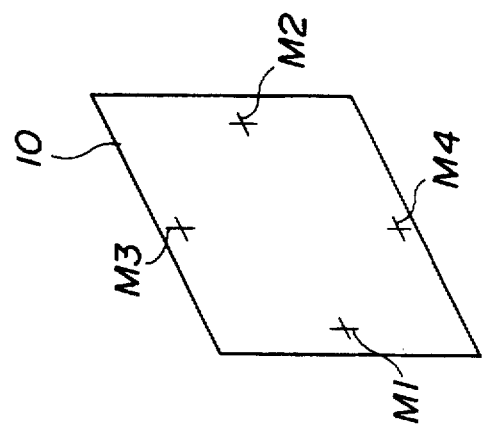
FIG.2

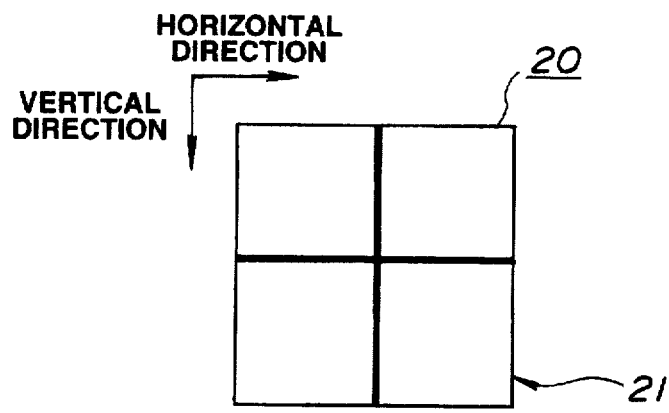
FIG.3
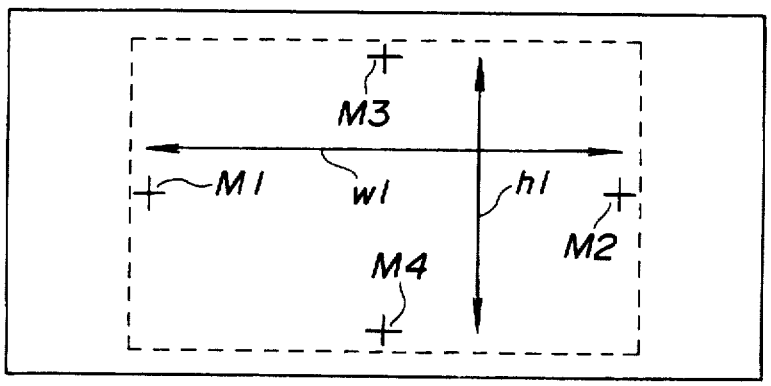
FIG.4 (a) HD PICTURE
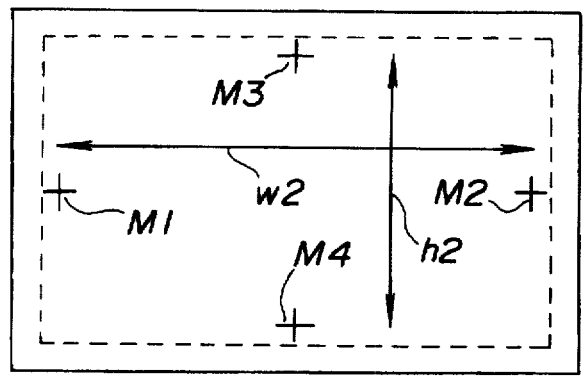
FIG.4 (b) SD PICTURE

HD SIGNAL

CORRECTION SD SIGNAL

PICTURE COINCIDENCE DETECTING APPARATUS AND METHOD

TECHNICAL FIELD

This invention relates to a picture coincidence detecting apparatus and a picture coincidence detecting method, which detect and evaluate, in pixel or block units, coincidence between two imaged pictures, and more particularly to a picture coincidence detecting apparatus and a picture coincidence detecting method suitable when used in allowing a lower resolution picture and a higher resolution picture imaged (image-picked up) by image pick-up devices having different resolutions.

BACKGROUND ART

In general, in digital signal processing for picture, there is a method in which pictures imaged by the same camera system are used to allow one image pick-up picture and the other image pick-up picture to be in correspondence with each other. This method is block matching method known in detection of movement (motion) quantity.

In accordance with this block matching method, a block of a predetermined size is first set on one image pick-up picture. Moreover, a search range for making search for the set block is set on the other image pick-up picture. Evaluation of picture coincidence is carried out in dependency upon whether or not the block and search block within the search range have similarity therebetween. The block matching method carries out a series of processing as described above over the entire picture to detect whether or not one image pick-up picture and the other image pick-up picture are in correspondence with each other.

In this case, since image pick-up pictures used are pictures imaged by the same camera system as described above, respective pictures are in correspondence with each other in picture angle format, i.e., aspect ratio and respective pixels within pictures respectively have one-to-one correspondence relationship to each other. For this reason, there occurs no difference in signal characteristics of respective pictures, particularly luminance signals. As a result, in the block matching method, coincidence detection with respect to desired respective pictures is easily carried out.

Meanwhile, in imaging the same object by different camera systems in place of image pick-up at the same camera system, it is impossible to conduct, with ease, coincidence detection between one picture and the other picture as described above. The cause thereof is as follows. Namely, impossibility or difficulty of coincidence detection takes place because picture angle (angle of view) formats of different camera systems are not in correspondence with each other, i.e., with respect to pixel position of block of one picture, picture position within the search range of the other picture is not in correspondence therewith.

In addition, since camera systems different from each other have specifications different from each other, e.g., optical filters of cameras used would be different, and/or any difference would take place also in the noise characteristics of imaged pictures. By imaging operation with such camera systems of different specifications, difference between respective output signal characteristics becomes conspicuous. Particularly, between pictures imaged by camera systems having different resolutions, differences qualitatively take place in level distribution of luminance signals and dynamic range between signals. For this reason, even if attempt is made to detect coincidence between pictures imaged in different formats, because positions of pixels constituting picture are not in correspondence with each other and characteristics of respective output pictures are not in correspondence with each other, detection of pictures completely coincident with each other was unable to be carried out.

An object of this invention is to provide a picture coincidence detecting apparatus and a picture coincidence method which can detect coincidence between pictures or pixels even with respect to pictures such that both pixel positions differ from each other, e.g., in dependency upon pictures having different picture angles (angle of view).

DISCLOSURE OF THE INVENTION

A picture coincidence detecting apparatus according to this invention is directed to a picture coincidence detecting apparatus adapted for detecting coincidence relationship between respective pixels of a first picture that a first image pick-up element comprised of a first number of pixels outputs and a second picture that a second image pick-up element comprised of a second number of pixels outputs, characterized in that the apparatus comprises: lower accuracy picture coincidence detecting means for carrying out low accuracy pixel matching on the basis of reference positions of the first and second pictures; and block matching processing means for carrying out block matching processing to set, on the second picture, a search range corresponding to block on the first picture in dependency upon detection result of the lower accuracy picture coincidence detecting means to make, within the search range, search for block on the second picture matching with the block on the first picture.

In this case, the block matching processing means is characterized in that it generates, by interpolation, data between respective pixels of the first and second pictures thereafter to carry out the block matching processing.

Moreover, the block matching processing means is characterized in that when the first picture is assumed to be lower resolution picture and the second picture is assumed to be higher resolution picture, it sets, on the higher resolution picture, search range corresponding to block on the lower resolution picture in dependency upon detection result of the lower accuracy picture coincidence detecting means to globally search, within the search range, block on the higher resolution picture matching with the block on the lower resolution picture to find out a candidate to further interpolate between respective pixels of the lower resolution picture and the higher resolution picture to thereby evaluate, with high accuracy, similarity between the set block and the block within the search range, thus to detect a picture where coincidence holds.

Further, the first and second image pick-up elements are characterized in that they image the same object.

Furthermore, the object is characterized in that a marker indicating pixel position of reference is attached thereto.

In addition, a picture coincidence detecting apparatus according to this invention is directed to a picture coincidence detecting apparatus adapted for detecting coincidence relationship between respective pixels of a first picture that a first image pick-up element comprised of a first number of pixels outputs and a second picture that a second image pick-up element comprised of a second number of pixels outputs, characterized in that the apparatus comprises: lower accuracy picture coincidence detecting means for carrying out lower accuracy pixel matching on the basis of reference positions of the first and second pictures; and block matching processing means for globally searching, within a search range set on the second picture, the first and second pictures in dependency upon detection result of the lower accuracy picture coincidence detecting means to select respective points of remark to set corresponding blocks including these points of remark at the first and second pictures to make a correction such that mean levels or standard deviations of these luminance signals are in correspondence with each other thereafter to implement block matching processing to the corresponding blocks.

In this case, the block matching processing means is characterized in that it repeats, n number of times, detection and correction of difference between mean levels of luminance signals, or detection and correction of ratio between standard deviations of luminance signals, and block matching processing while hierarchically n number of times reducing the corresponding blocks.

Moreover, the block matching processing means is characterized in that it generates, by interpolation, data between respective pixels of the first and second pictures thereafter to carry out the block matching processing.

Further, the first and second image pick-up elements are characterized in that they image the same object.

Furthermore, the object is characterized in that a marker indicating pixel position of reference is attached thereto.

In addition, a picture coincidence detecting apparatus according to this invention is directed to a picture coincidence detecting apparatus adapted for detecting coincidence relationship between respective pixels of a first picture that a first image pick-up element comprised of a first number of pixels outputs and a second picture that a second image pick-up element comprised of a second number of pixels outputs, characterized in that the apparatus comprises: lower accuracy picture coincidence detecting means for carrying out low accuracy pixel matching on the basis of reference positions of the first and second pictures; and block matching processing means for globally searching the first and second pictures in dependency upon detection result of the lower accuracy picture coincidence detecting means to select respective points of remark to respectively set corresponding blocks including these points of remark thereafter to determine difference between luminance signal mean levels or ratio between standard deviations thereof of block within the first picture and block within the second picture while allowing the corresponding blocks to be greater in a stepwise manner to correct the luminance signal mean levels or standard deviations thereof within the corresponding blocks by using value of difference or ratio when the difference or ratio determined above is converted to successively implement matching processing from larger blocks to lower blocks of hierarchical plural blocks.

In this case, the block matching processing means is characterized in that it generates, by interpolation, data between respective pixels of the first and second pictures thereafter to carry out the block matching processing.

Moreover, the first and second image pick-up elements are characterized in that they image the same object.

Further, the object is characterized in that a marker indicating pixel position of reference is attached thereto.

In addition, a picture coincidence detecting method according to this invention is directed to a picture coincidence detecting method of detecting coincidence between respective still pictures imaged by cameras having different resolutions, characterized in that the method comprises: block setting step of setting a block of a predetermined size within a lower resolution picture; search range setting step of setting a search range corresponding to the block on a higher resolution picture; candidate search step of globally searching the search range to find out a candidate; and block coincidence detecting step of interpolating between respective pixels of the higher resolution picture and the lower resolution picture to thereby evaluate, with high accuracy, similarity between the set block and block within the search range to detect a picture where coincidence holds.

In this case, prior to implementation of the picture coincidence detecting processing, mean values or standard deviations of luminance signal levels of higher resolution picture and lower resolution picture are caused to coincide with each other over the entirety of picture. In carrying out coincidence detection of block unit, mean values or standard deviations of luminance signal levels are caused to coincide with each other in local corresponding block units.

Moreover, in the block coincidence detecting step, as a method of evaluating similarity between blocks of higher resolution picture and lower resolution picture, correlative coefficients between blocks are used to carry out evaluation.

Further, in the block coincidence detecting step, as a method of evaluating similarity between blocks of higher resolution picture and lower resolution picture, absolute value sum of differences between blocks is used to carry out evaluation.

Furthermore, in the block coincidence detecting step, as a method of evaluating similarity between blocks of higher resolution picture and lower resolution picture, square sum of differences between blocks is used to carry out evaluation.

In addition, a picture coincidence detecting method of this invention is directed to a picture coincidence detecting method of detecting coincidence between respective still pictures imaged by cameras having different resolutions, characterized in that the method comprises: block setting step of setting a block of a predetermined size within a lower resolution picture; search range setting step of setting a search range corresponding to the block on a higher resolution picture; candidate search step of globally searching the search range to find out a candidate: and block coincidence detecting step of setting corresponding blocks including the candidate searched at the candidate search step in pictures of lower resolution and higher resolution to make a correction such that these luminance signal mean levels or standard deviations thereof coincide with each other thereafter to evaluate, with high accuracy, similarity between the corresponding blocks to detect a picture where coincidence is obtained.

In this case, the block coincidence detecting step is characterized in that it repeats, n number of times, detection and correction of difference between mean levels of luminance signals, or detection and correction of ratio between standard deviations of luminance signals, and block matching processing while hierarchically reducing n number of times the corresponding blocks.

Moreover, the block coincidence detecting step is characterised in that it synthetically judges evaluation values in matching every respective ranks to carry out correction of matching candidate pixels.

Further, the block coincidence detecting step is characterized in that it adjusts, when evaluation value of higher rank is applied to evaluation value of lower rank, block size and search area in matching so that there exists evaluation value of higher rank corresponding to position of pixel to be evaluated of lower rank.

Furthermore, a picture coincidence detecting method according to this invention is directed to a picture coincidence detecting method of detecting coincidence between still pictures imaged by cameras having different resolutions, characterized in that the method comprises: block setting step of setting a block of a predetermined size within a lower resolution picture; search range setting step of setting a search range corresponding to the block on a higher resolution picture; candidate search step of globally searching the search range to find out a candidate; and block coincidence detecting step of respectively setting corresponding blocks including the candidate searched at the candidate search step thereafter to determine difference between luminance signal mean levels or ratio between standard deviations thereof of block within the lower resolution picture and block within the higher resolution picture while allowing the corresponding blocks to be greater in a stepwise manner to successively implement matching processing from larger blocks to smaller blocks of hierarchical plural blocks by using difference or ratio when the difference or ratio determined above is converged to detect a picture where coincidence is obtained.

In this case, the block coincidence detecting step is characterized in that it generates, by interpolation, data between respective pixels of the first and second pictures thereafter to respectively set corresponding blocks including the candidate searched at the candidate search step to determine difference between luminance signal means levels or ratio between standard deviations thereof of block within the lower resolution picture and block within the higher resolution picture while allowing the corresponding blocks to be greater in a stepwise manner to successively implement matching processing from larger blocks to smaller blocks of hierarchical plural blocks by using difference or ratio when the difference or ratio determined above is converged to detect a picture in which coincidence is established.

BRIEF DESCRIPTION OF THE DRAWINGS

FIG. 2 is a block circuit diagram showing circuit configuration corresponding to pre-processing section in the functional block of the picture coincidence detecting apparatus of the first embodiment of this invention.

FIG. 3 is a model view showing marker used as reference of detection of position in image pick-up picture.

FIGS. 4A and 4B are a model view showing arrangement relationship of marker used as reference of detection of position in image pick-up picture.

BEST MODE FOR CARRYING OUT THE INVENTION

Several embodiments of a picture coincidence detecting apparatus and a picture coincidence detecting method according to this invention will now be described with reference to the attached drawings.

The picture coincidence detecting apparatus in this invention is directed to, e.g., an apparatus adapted for detecting coincidence relationship between respective pixels of a first picture that a first image pick-up element comprised of a first number of pixels outputs and a second picture that a second image pick-up element comprised of a second number of pixel outputs. In this invention, as an example, a lower resolution picture (hereinafter referred to as SD (Standard Definition) picture) is comprised of 525 lines, e.g., NTSC system, one of the standard television systems, is referred to as the first picture and a higher resolution picture (hereinafter referred to as HD (High Definition) picture) is comprised of, e.g., 1125 lines in a higher definition system, is referred to as the second picture.

Figure 1:
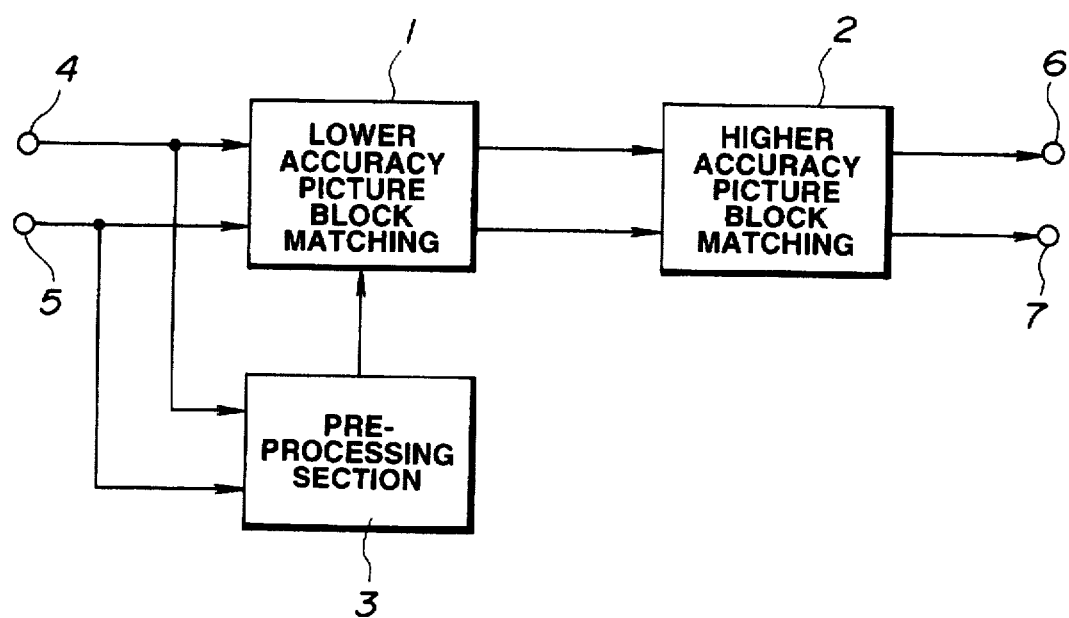
FIG. 1 is a functional block diagram showing functional configuration of a picture coincidence detecting apparatus of a first embodiment of this invention.

The picture coincidence detecting apparatus serving as the first embodiment to which this invention is applied comprises, as shown in FIG. 1, for example, a lower accuracy picture block matching functional section 1 as lower accuracy picture coincidence detecting means for carrying out pixel matching of lower accuracy on the basis of reference positions and the numbers of pixels of the first and second pictures, and a higher accuracy picture block matching functional section 2 as block matching processing means for implementing block matching processing to a picture obtained by interpolating between respective pixels in dependency upon a detection result of the lower accuracy picture block matching functional section 1. Moreover, the picture coincidence detecting apparatus allows pre-processing section 3 to absorb the difference in signal characteristic between the lower accuracy picture and the higher accuracy picture.

SD picture and HD picture are respectively delivered to lower accuracy picture block matching functional section 1 and pre-processing section 3 through input terminals 4, 5.

The pre-processing section 3 extracts information indicating the relationship of position data (reference position information) and pixel No. data from the first and second pictures to deliver them to lower accuracy picture block matching functional section 1. This lower accuracy picture block matching functional section 1 carries out pixel matching of low accuracy with respect to the SD picture and the HD picture in dependency upon pixel data and reference position information delivered from pre-processing section 3. The pixel matching of lower accuracy that the lower accuracy picture block matching functional section 1 carries out comprises setting an initial address as a reference position in carrying out the blocking of pixels. Namely, this lower accuracy picture block matching functional section 1 provides the positional relationship between picture data of HD picture and SD picture with a marker position serving as a reference, i.e., provides predicted corresponding pixel position as an initial value. It is to be noted that detailed explanation will be given later in connection with processing of the lower accuracy picture block matching functional section 1.

Higher accuracy picture block matching functional section 2 implements block matching processing with pictures obtained by interpolating between respective pixels in dependency upon detection result of lower accuracy picture block matching functional section 1 as described above. In a more practical sense, this higher accuracy picture block matching functional section 2 sets a search range corresponding to a block of an arbitrary range set within SD picture in dependency upon the detection result of the lower accuracy block matching functional section 1, i.e., an initial address to globally search, within the search range, block on the HD picture corresponding to the block on the SD picture to find a candidate of coincidence area to further interpolate between respective pixels of SD picture and HD picture to thereby evaluate, with high accuracy, the similarity between the set block and block within the search range to detect where picture coincidence is obtained. Then, the functional section 2 outputs respective pictures where coincidence has been detected with high accuracy from output terminals 6, 7. It is to be noted that detailed explanation will be given later also in connection with processing of the higher accuracy picture block matching functional section 2.

Circuit configuration of pre-processing section 3 for effectively carrying out processing of the picture coincidence detecting apparatus will now be described.

The pre-processing section 3 comprises, as shown in FIG. 2, for example, marker detecting section 13 for detecting, with respect to respective pictures, markers written in the same object from picture data of SD picture and HD picture with respect to the object with markers imaged at image pick-up devices 11, 12 corresponding to respective specifications, and a marker position judging section 14 for carrying out marker position judgment on the basis of detection result of the marker detecting section 13.

The image pick-up device 11 comprises first image pickup element section 11a comprised of a first number of pixels, which images the object, SD picture storage section 11b for storing SD picture corresponding to first picture imaged at the first image pick-up element 11a, and camera adjustment section 11c for adjusting, for example, physical position, angle, zoom ratio and the like of the image pick-up device in dependency upon a control signal delivered from marker position judging section 14.

Moreover, the image pick-up device 12 comprises second image pick-up element section 12a comprised of a second number of pixels, which images the object, HD picture storage section 12b for storing HD picture corresponding to second picture imaged at the second image pick-up element section 12a, and camera adjustment section 12c for carrying out adjustment of camera in dependency upon a control signal delivered from marker position judging section 14.

The pre-processing section 3 inputs SD picture and HD picture imaged at image pick-up devices 11, 12 to marker detecting section 13 respectively through SD picture storage section 11b and HD picture storage section 12b. The marker detecting section 13 detects marker indicating pixel position of reference from picture data of SD picture and HD picture with respect to the same object. This marker is recorded simultaneously at the time of imaging object. Marker detected at marker detecting section 13 is delivered to marker position judging section 14. This marker position judging section 14 carries out marker position judgment on the basis of detection result of marker detecting section 13.

In a more practical sense, this marker position judging section 14 absorbs the difference between the signal characteristics of SD picture and HD picture in order to allow lower accuracy picture block matching functional section 1 to carry out pixel matching of low accuracy, on the basis of the detection result. This processing takes mean values and standard deviations of luminance signals of respective pictures to thereby correct luminance signals of, e.g., SD picture. The judging section 14 carries out, on the basis of the result, judgment as to whether or not detected marker position is in correspondence with set picture frame condition. In the case where the former is not in correspondence with the latter, marker position judging section 14 delivers control signals respectively to camera adjustment sections 11c, 12c that image pick-up devices 11, 12 have to adjust, e.g., physical position, angle and zoom rate, or light quantity, etc. as occasion demands of the image pick-up devices 11, 12 to carry out image pick-up operation for a second time to repeat the above-described operation until the picture frame condition can be satisfied. Explanation will be given later in connection with the set picture frame condition.

By carrying out such a processing, pre-processing section 3 absorbs the difference between signal characteristics of SD picture and HD picture, and can also recognize, from picture data or reference position information of respective pixels, how SD picture of aspect ratio 4:3 should be adjusted with respect to HD picture of aspect ratio 16:9. It should be noted that a switching control signal corresponding to judgment result of marker position judging section 14 of the pre-processing section 3 may be sent to selector (changeover) switch SW as shown in FIG. 2, for example, thus to control whether or not the picture should be employed.

A marker indicating the reference position of a picture frame will now be described.

As an example of a marker, a marker having black lines contained crosswise in a white background in marker area 20 is used as shown in FIG. 3. Such markers are attached as shown in (a) and (b) of FIG. 4 at four positions M1, M2, M3 and M4 in horizontal and vertical directions on position of object to respectively image pictures including these marks M1, M2, M3 and M4. Respective markers are arranged within picture frame 21 on the object. Markers M1, M2 are arranged at the same horizontal position and markers M3, M4 are arranged at the same vertical position.

In HD picture, as shown in FIG. 4(a), for example, distance between intersecting points of markers M1, M2 in horizontal direction is set as W1, and distance between intersecting points of markers M3, M4 in vertical direction is set as h1. Moreover, in SD picture, since picture angle format thereof is different from that of the HD picture, respective markers are set at different positions in a manner such that distance between intersecting points of markers M1, M2 in horizontal direction is set as w2, and distance between intersecting points of markers M3, M4 in vertical direction is set as h2 as shown in FIG. 4(b), for example.

The procedure for marker detection carried out at the marker detecting section 13 shown in FIG. 2 will be briefly described. Marker detecting section 13 determines, by calculation, intersecting point positions of black lines. Initially, in the vicinity of markers attached on respective pictures, marker area 20 is set so that pictures of only white background and black lines are formed in areas in the vicinity thereof. Then, coordinates within respective marker areas 20 are assumed to be (x, y) and luminance signal level at these coordinates (x, y) is assumed to be $Y_{x,y}$ to respectively determine integrated values of luminance signal levels with respect to the horizontal x-direction and the vertical y-direction.

Under the condition that the y-coordinate is caused to be constant with respect to 1 scanning line (i.e., y-coordinate y=h constant), luminance signal level integrated value $S_h$ in horizontal direction is expressed below by additively determining luminance signal levels of respective pixels in changing variable i as x-coordinate, e.g., from zero to N:

$$S_h = \sum_{i=0}^{N} Y_{i,h} \quad (1)$$

Moreover, in marker position determination in line direction, i.e., in vertical direction of scanning lines, under the condition that x-coordinate is fixed to a predetermined x-coordinate x=w, luminance signal level integrated value $S_w$ is expressed below by additively determining luminance signal levels of respective pixels in changing variable j as y-coordinate, e.g., from zero to N:

$$S_w = \sum_{j=0}^{N} Y_{w,j} \quad (2)$$

In the above formula, suffix w indicates x-coordinate to be fixed, suffix h indicates line position to be fixed, and N indicates the numbers of pixels in horizontal and vertical directions of marker area 20. As is clear from this relationship, suffix h indicating minimum value min ($S_h$) of the luminance signal level integrated value $S_h$ indicates y-coordinate $h_m$ crossing with line in vertical line of crossing marker. Moreover, suffix w indicating minimum value min ($S_w$) of the luminance signal level integrated value $S_w$ indicates x-coordinate $W_m$ crossing with line in horizontal direction of crossing marker. Accordingly, when function min () is assumed to be function to output minimum coordinates, crossing point coordinates of markers are expressed below:

$$(\min(S_w), \min(S_h)) = (W_m, h_m) \quad (3)$$

[Condition: w=0, ..., N; h=0, ..., N]

In a manner stated above, crossing point coordinates ($w_m$, $h_m$) of marker area 20 are detected as crossing points.

Then, judgment of the detected marker position is carried out at marker position judging section 14. Markers M1–M4 shown in FIGS. 4(a) and 4(b) are also imaged and are taken onto HD picture and SD picture. In this case, in order to prevent any rotational component from being mixed into imaged picture by shift of relative position between image pick-up devices 11, 12, imaging is carried out so that horizontal and vertical properties of HD picture and SD picture are respectively in correspondence with each other. With respect to crossing pint coordinates of markers attached to object in advance, since y-coordinates of markers M1, M2 and x-coordinates of markers M3, M4 are arranged at the same position, there occurs the necessity in which both pictures also take the same coordinate values with the above-described coordinates of respective markers being as point. It is the imaging condition with respect to marker positions in respective pictures that an approach is employed to carry out image pick-up operation with the positional relationship of these marker center coordinates being maintained. As previously described, since this image pick-up condition is satisfied, marker position judging section 14 controls camera adjustment sections 11c, 12c provided at image pick-up devices 11, 12 to carry out marker position adjustment.

On the other hand, in the case where picture which takes matching is HD picture versus SD picture, HD picture has resolution substantially twice greater than that of SD picture from formats of respective pictures. However, since aspect ratios of HD picture and SD picture are different, the numbers of pixels included between markers would be shifted in horizontal and vertical directions of marker center. Moreover, at the time of up-converting SD picture into HD picture, or down-converting HD picture into SD picture, in consideration of the difference between the aspect ratios, pictures may be displayed at various picture sizes, e.g., in such a manner to display picture with SD picture being inserted into large HD picture area, or to display picture with position where picture is displayed being allowed to be near to one side, or in a manner of changing zoom rate to shave a portion of picture. There occurs the necessity of determining the relationship between both pictures from positional relationship between one picture data and the other picture data.

When it is now assumed that the number of pixels between markers in horizontal direction in HD picture is w1, the number of pixels between markers in horizontal direction in SD picture is w2, the number of pixels between markers in vertical direction in HD picture is h1, and the number of pixels between markers in vertical direction in SD picture is h2, the relationship of the number of pixels between markers of HD picture and SD picture is expressed as follows:

$$w1 = 2 \times w2 \quad (4)$$

$$h1 = 2 \times h2 \quad (5)$$

However, it is impossible to satisfy the above-mentioned formulas (4) and (5) at the same time because of difference of aspect ratio as described above.

Accordingly, in this embodiment, when the relationship of the number of pixels between markers in vertical direction, i.e., the formula (5) is satisfied, the relationship of the number of pixels between markers of HD picture and SD picture is expressed below from the relationship of pixel aspect ratio:

$$w1 < 2 \times w2 \quad (6)$$

$$h1 = 2 \times h2 \quad (5)$$

Figure 6:
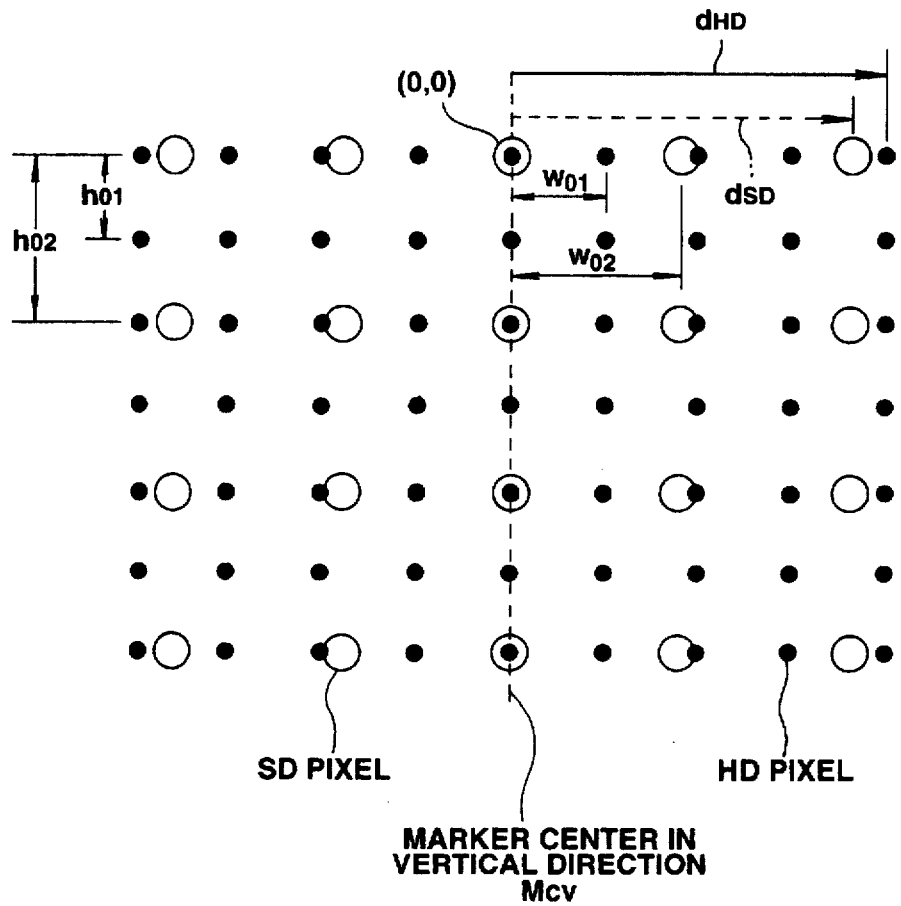
FIG. 6 is a model view showing positional relationship of pixels in horizontal direction of both pictures in allowing phases of scanning lines to coincide with each other in picture coincidence detection of HD picture and SD picture.

(Make reference to the relationship of FIG. 6)

When coincidence of respective marker positions of HD picture and SD picture, i.e., reference position condition and pixel data condition of the formulas (6) and (5) are satisfied at the same time in this way, picture coincidence detecting apparatus employs HD picture and SD picture inputted thereto.

Then, the picture coincidence detecting apparatus of the first embodiment starts a processing operation for determining respective corresponding pixels by using the HD picture and the SD picture described above. This procedure will now be described by making reference to, e.g., the main flowchart shown in FIG. 5 and the model view showing the relationship of the number of pixels between markers of HD picture and SD picture of FIG. 6. In the procedure referred to below, picture coincidence procedure in up-converting SD picture into HD picture is mainly described.

With respect to HD picture and SD picture which have been imaged, since luminance signal level means and dynamic ranges between signals of the both pictures are different, pixel matching is difficult. Accordingly, initially, in picture coincidence pre-processing subroutine SUB1, in order to absorb such difference of signal characteristics, e.g., mean value and standard deviation of luminance signal levels in respective pictures are corrected. Namely, in the picture coincidence pre-processing subroutine SUB1, mean value (hereinafter referred to as offset as occasion demands) and standard deviation (referred to as gain as occasion demands) of luminance signal levels for permitting SD picture to correspond to HD picture are corrected.

Figure 7:
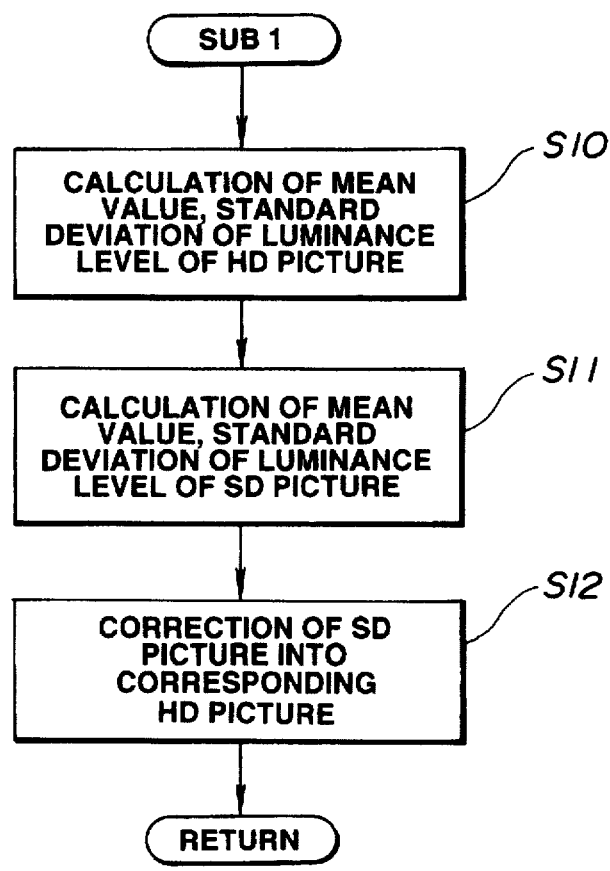
FIG. 7 is a flowchart showing procedure of subroutine SUB1 in the main flowchart shown in FIG. 5.

The processing procedure of the picture coincidence pre-processing subroutine SUB1 will now be described with reference to FIG. 7. In FIG. 7, at step S10, mean value and standard deviation of luminance signal levels of HD picture are calculated with respect to all pixels to be subjected to matching in one frame.

Then, at step S11, mean value and standard deviation of luminance signal levels of SD picture are calculated with respect to all pixels to be subjected to matching in one frame.

At step S12, values calculated at the steps S10, S11 are used to correct mean value and standard deviation of luminance signal levels of SD picture so that they are changed into mean value and standard deviation of luminance signal levels of HD picture. As this correction method, when it is now assumed that respective variables are such that e.g., mean value of luminance signal levels of HD picture is $Mean_{HD}$, standard deviation of the luminance signal levels thereof is $Stdv_{HD}$, mean value of luminance signal levels of SD picture is $Mean_{SD}$, and standard deviation of luminance signal levels thereof is $Stdv_{SD}$, luminance signal level $Y_{SD}$ of corrected SD picture is determined from the following formula:

$$Y_{SD} = (Y_{HD} - Mean_{SD}) \times \frac{Stdv_{HD}}{Stdv_{SD}} + Mean_{HD} \quad (7)$$

In this way, SD picture is corrected so as to become close to signal characteristic of HD picture to absorb difference of signal characteristic.

When correction at the picture coincidence pre-processing subroutine SUB1 is completed, the processing operation proceeds to step S1.

At step S1, lower accuracy picture block matching functional section 1 is caused to carry out setting of the initial address of the corresponding pixel. In the case where the number of scanning lines of HD picture between two markers in vertical direction, i.e., between marker M3 and marker M4 is just twice greater than the number of scanning lines of SD picture as indicated by the above-mentioned formulas (5), (6), the pixel position relationship in the horizontal direction becomes the relationship in which pixel arrangement phases are shifted in a manner of axial symmetry with marker center line $M_{cv}$ in the vertical direction of markers M3 and M4 serving as the axis as shown in FIG. 6. Accordingly, as distance from position of marker center line $M_{cv}$ becomes greater in the horizontal direction, phase is shifted to a larger degree.

As apparent from FIG. 6, when it is assumed that the relationship between pixel No. w1 in HD picture and pixel No. w2 in SD picture is, e.g., pixel No. w2=2, only three pixels can be inserted as HD pixel number w1 between these two SD pixels. Thus, it becomes clear that pixel number relationship w1<2×w2 holds.

The general relationship is determined from distances between respective pixels. When distance $h_{o1}$ between HD pixels is taken as a reference, from the formula (5), the relationship between distance $h_{o1}$ between HD pixels and distance $h_{o2}$ between SD pixels is expressed below:

$$h_{o2}=2h_{o1}$$

Moreover, when distance $w_{o1}$ between HD pixels is taken as a reference, from the formula (6), the relationship between distance $w_{o1}$ between HD pixels and distance $w_{o2}$ between SD pixels in the horizontal direction of FIG. 6 is expressed below.

$$W_{o2}<2w_{o1}$$

Ratio of distance between pixels of SD pixel to distance between pixels of HD pixel becomes equal to $w_{o2}/w_{o1}$.

When ratio of distance between pixels (inter-pixel distance) of HD pixel to SD pixel per 1HD pixel is determined from such a relationship to express it in terms of the number of pixels, this ratio becomes equal to $(2 \times w2)/w1$. No. of pixels $d_{HD}$ of arbitrary HD within picture frame apart in a horizontal direction from center position $M_{CV}$ in vertical direction of FIG. 6 can be determined as below when No. of pixels of SD similarly apart in horizontal direction from center position $M_{cv}$ is assumed to be $d_{SD}$.

$$d_{HD} = d_{SD} \times \frac{W1}{2 \times W2} \quad (8)$$

At step S1, an initial address as reference position in carrying out blocking of pixels is set by using these number of pixels $d_{SD}$, $d_{HD}$.

After this initial address is set at lower accuracy picture block matching functional section 1, higher accuracy picture block matching functional section 2 carries out block matching processing of corresponding pixels in a manner of subroutine SUB2 on the basis of the initial address. Namely, in this subroutine SUB2, higher accuracy picture block matching functional section 2 sets a search range corresponding to a block in an arbitrary range set within SD picture in accordance with the detection result of the lower accuracy block matching functional section 1, i.e., an initial address to globally search, within the search range, for the block on the HD picture corresponding to the block on the SD picture to find a candidate of coincidence area.

Figure 8:
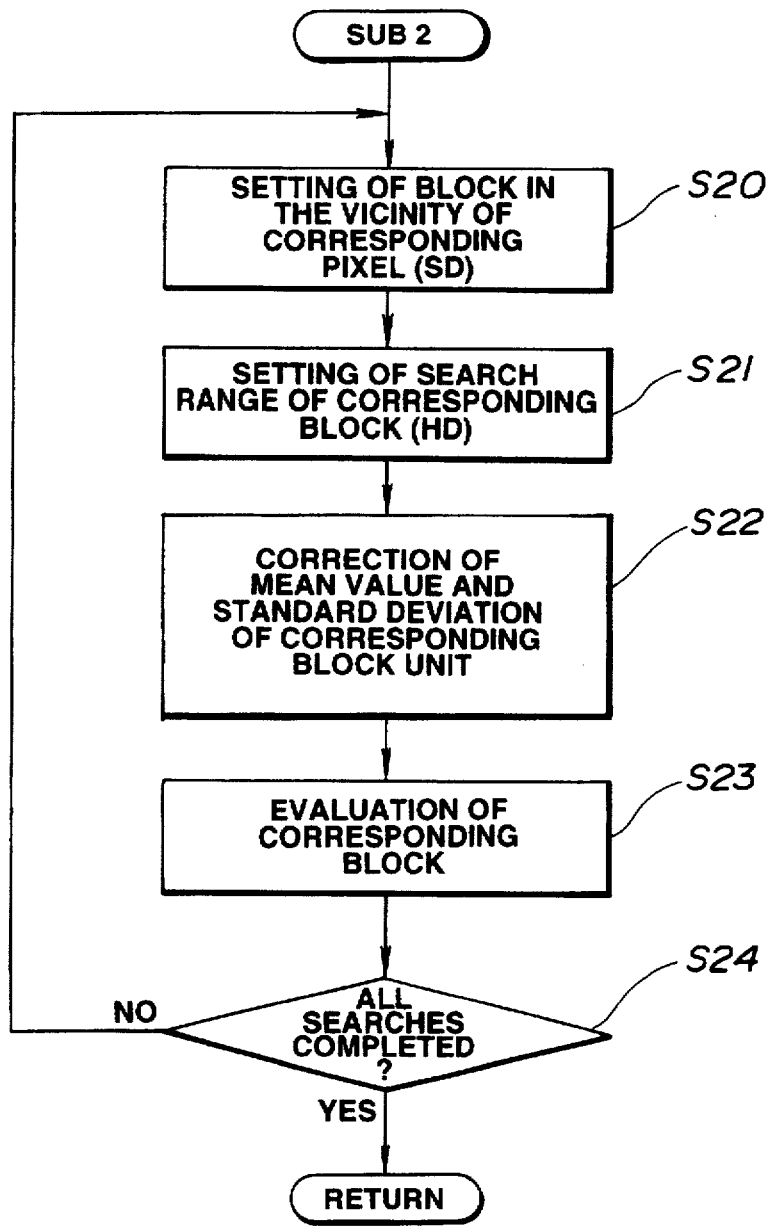
FIG. 8 is a flowchart showing procedure of subroutine SUB2 in the main flowchart shown in FIG. 5.

Processing procedure of subroutine SUB 2 for carrying out block matching of the corresponding pixels will now be described with reference to FIG. 8. Initially, a step S20, a pixel on the center axis Mcv of FIG. 6 is defined as the objective pixel to set blocks in the vicinity thereof on SD picture with the objective pixel as center. As apparent from FIG. 6, phase shifts in horizontal direction of SD pixel and HD pixel in the vicinity of the objective pixel are very small.

For this reason, the influence of picture angles of respective pixels, i.e., aspect ratio of SD picture and HD picture, can be disregarded. Accordingly, blocks provided on the HD picture side are caused to have block configuration in which pixels are taken every other sample.

Then, at step S21, the setting of a search range of a corresponding block on HD picture is carried out.

At step S22, the mean value and standard deviation of luminance signal levels are correction processed in block units between the block of the SD picture side and the search block of the HD picture side set at steps S20, S21.

With respect to this correction processing, while the correction of luminance signal level is carried out with respect to the picture of one frame at step S12 of the subroutine SUB 1, since there are many cases where implementation of only such correction processing is insufficient, re-correction is locally carried out with respect to individual blocks. This correction processing aims at facilitating matching to be easily taken by this processing.

At step S23, on the basis of the result at the above-described step S22, evaluation is carried out with both the block on the SD picture side and the search blocks of the HD picture side being as corresponding block within search range thereof.

When block size of the SD picture side is M×N pixels, search range is ±dm pixels, luminance signal level of SD frame is $Y_{SD}$, and luminance signal level of HD frame is $Y_{HD}$, evaluation function NCCF (i, j) for carrying out block matching is expressed as follows:

$$NCCF(i,j) = \frac{\sum_{m=1}^{M}\sum_{n=1}^{N} Y_{SD}(m,n) \cdot Y_{HD}(2m+i, 2n+j)}{\left[\sum_{m=1}^{M}\sum_{n=1}^{N} Y_{SD}^2(m,n)\right]^{\frac{1}{2}} \left[2\sum_{m=1}^{M}\sum_{n=1}^{N} Y_{HD}^2(2m+i, 2n+j)\right]^{\frac{1}{2}}} \quad (9)$$

In the above formula, i and j respectively change in the range of −dm or more and in the range of dm or less (i.e., −dm≦i, j≦dm). The reason why variables of luminance signal level $Y_{HD}$ are assumed to be (2m +i), (2n +i) is that the degrees of extraction of corresponding pixels are respectively different at SD picture and HD picture as shown in FIG. 6. This formula (9) determines correlative coefficients between blocks, and blocks where calculated NCCF (i, j) becomes maximum are caused to be optimum values correlative with each other. It should be noted while NCCF (i, j) is used as an evaluation function in this embodiment, the method of implementing block matching is not limited to NCCF (i, j) as the evaluation function, but there are ordinarily instances where absolute value sum MAD (i, j) of differences between blocks or square sum MSE (i, j) of differences between blocks may be used. MAD (i, j) and MSE (i, j) are respectively expressed as follows:

$$MAD(i,j) = \frac{1}{MN} \sum_{m=1}^{M}\sum_{n=1}^{N} |Y_{SD}(m,n) - Y_{HD}(2m+i, 2n+j)| \quad (10)$$

$$MSE(i,j) = \frac{1}{MN} \sum_{m=1}^{M}\sum_{n=1}^{N} [Y_{SD}(m,n) - Y_{HD}(2m+i, 2n+j)]^2 \quad (11)$$

For evaluation of these functions, MAD (i, j) or MSE (i, j) which becomes minimum is used as optimum value. Ordinarily, the case where MAD of the formula (10) is used is general. By setting a block determined at step S2 in this case as "candidate", block matching processing is carried out, thus making it possible to extract a position where difference between blocks is minimum as a probable pixel.

At step S24, judgment as to whether or not matching processing is entirely carried out so that the search is completed is carried out. When all searches are not yet completed, processing operation returns to step S20 to repeat the above-described series of processing. Moreover, when all searches are completed, it is considered that processing are all completed to complete this subroutine SUB 2 to return to step S2 of the main flowchart of FIG. 5.

At step S2, the search result of "candidate" at subroutine SUB 2 is used to globally search corresponding blocks of HD picture and SD picture, thus to determine optimum "candidate".

Figure 9:
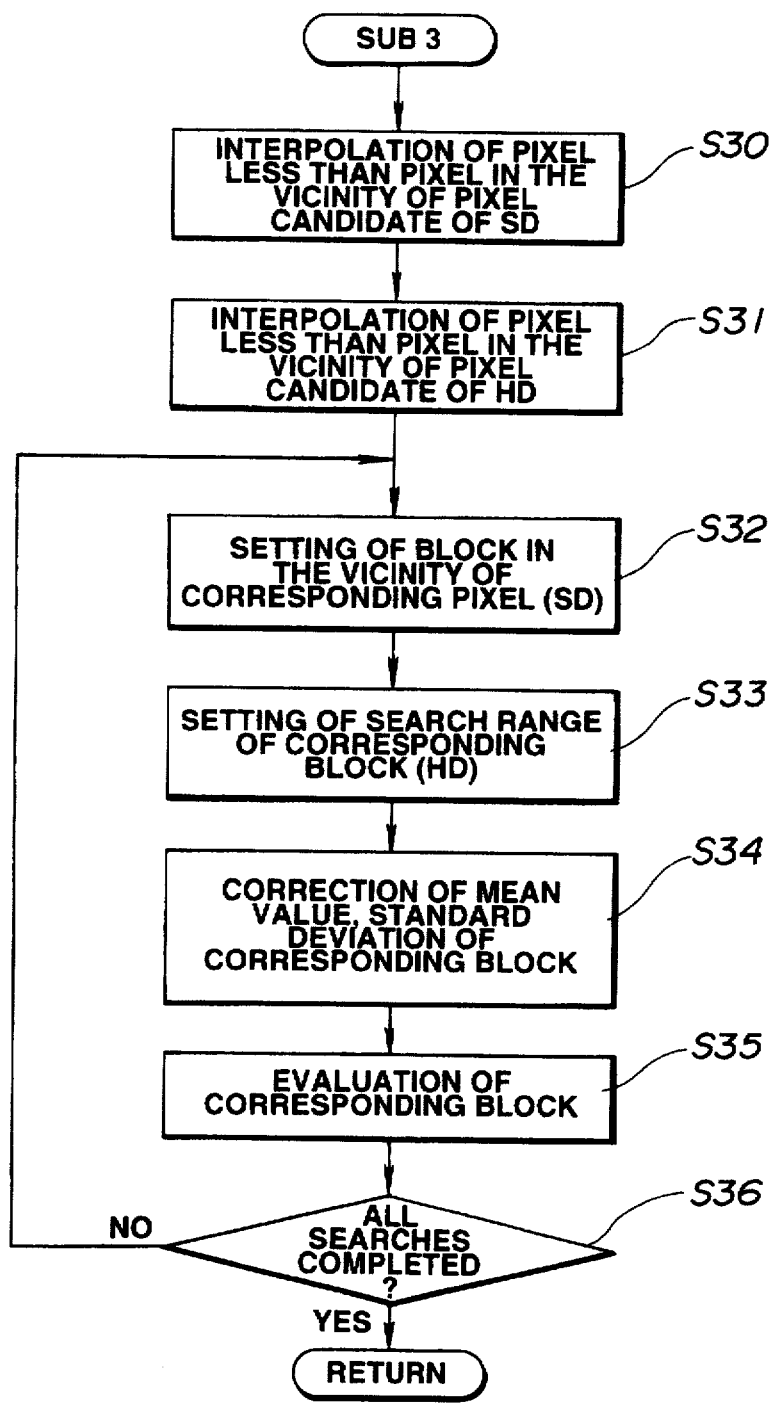
FIG. 9 is a flowchart showing procedure of subroutine SUB3 in the main flowchart shown in FIG. 5.

Then, higher accuracy block matching processing with respect to the determined optimum "candidate" is carried out at subroutine SUB 3. This higher accuracy block matching processing will now be described with reference to FIGS. 9 and 10. Initially, the necessity of carrying out this higher accuracy block matching processing is that even if phases of scanning lines in the vertical direction in HD pixel and SD pixel are caused to be in correspondence with each other as shown in FIG. 6, shift increases as pixel distance in the horizontal direction away from the reference becomes greater. Accordingly, even if there is any shift of pixel in the horizontal direction, matching between pixels is taken to provide coincidence therebetween. Thus, phase matching of pixels is carried out such that, also with respect to position where there is no corresponding pixel, pixels generated by, e.g., interpolation processing are used to carry out such matching at accuracy less than actual pixel.

Initially, in order to carry out higher accuracy block matching processing, pixels less than pixels that picture has are set. For this reason, pixel less than pixel is represented by linearly interpolated pixel.

Figure 10:
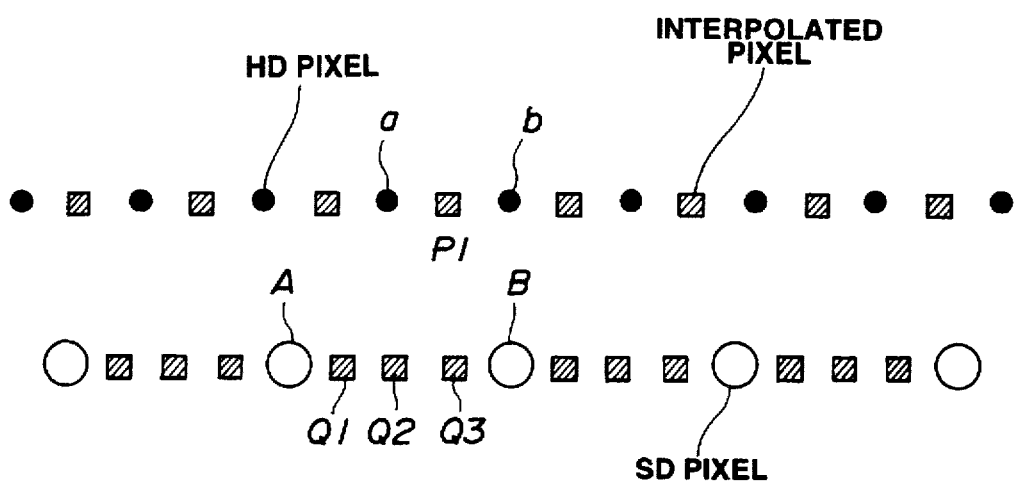
FIG. 10 is a model view showing the relationship of interpolation between pixels in horizontal direction at HD picture and SD picture, which is carried out in conducting higher accuracy block matching below pixel.

The relationship between pixels in horizontal direction that SD picture and HD picture respectively originally have and interpolated pictures is a relationship as shown in FIG. 10, for example. The relationship of interpolation between pixels will now be described. Since resolution of HD picture is substantially twice greater than that of SD picture, the number of interpolation pixels of SD picture is caused to be twice greater than that of HD picture. The relationship of interpolated pixels shown in FIG. 10 shows the case of the relationship in which original resolution between pixels of SD picture is 4 to dispose three interpolation pixels $Q_1$, $Q_2$, $Q_3$ between pixel candidates A, B to carry out interpolation thereof, and original resolution between pixels of HD picture is 2 to dispose one interpolation pixel $P_1$ between pixel candidates a, b to carry out interpolation thereof. Generation of these interpolated pixels is carried out by linear interpolation processing.

Initially, at step S30, interpolated pixels $Q_1$, $Q_2$, $Q_3$ which are pixels less than pixels in the vicinity of pixel is determined by calculation by using, e.g., pixel candidates A, B of FIG. 10 of SD picture. Interpolated pixels $Q_1$, $Q_2$, $Q_3$ by linear interpolation are determined by the following formulas (12), (13) and (14):

$$Q_1 = \frac{3 \cdot A + B}{4} \quad (12)$$

$$Q_2 = \frac{2 \cdot A + 2 \cdot B}{4} \quad (13)$$

$$Q_3 = \frac{A + 3 \cdot B}{4} \quad (14)$$

Then, at step S31, interpolated pixel $P_1$ which is pixel less than pixel in the vicinity of pixel is determined by calculation by using, e.g., pixel candidates a, b of FIG. 10 of HD picture. Interpolated pixel P1 by linear interpolation is determined by the following formula (15)

$$P_1 = \frac{a+b}{2} \tag{15}$$

When this linear interpolation calculation is represented by general expression, in the case where pixels are interpolated by resolution n, interpolated pixel value $H_i$ can be determined by the following formula:

$$H_i = \frac{(n-1)\cdot A + i \cdot B}{n} \tag{16}$$

In the above formula, the variable i is i=1, . . . , (n−1).

Processing of five steps from step 32 up to step S36 which will be conducted next are exactly the same processing as processing of five steps from step S20 up to step S24 of subroutine SUB 2 to implement block matching to a block including an interpolated pixel.

Judgment of matching is carried out at step S3 on the basis of result of the subroutine SUB 3. Namely, at step S3, judgment as to whether or not candidate pixels which have examined matching at accuracy less than pixel calculated at subroutine SUB 3 are employed is carried out. This judgment is carried out so that candidate pixels are employed when optimum value of matching is not value at pixel position except for interpolated pixel or candidate pixel, but is value at position of candidate pixel, and evaluation value of that candidate pixel is value better than threshold value set in a advance.

In employment of this block, mark position/block matching processing section carries out switching so as to output pixel of block to selector switch SW. In this way, coping operations of pictures of different accuracies can be carried out every pixels.

Then, when pixel position of "candidate" which is result of the subroutine SUB 3 becomes in correspondence with address of pixel position which becomes optimum, and evaluation value at that time was judged to be reasonable, processing operation proceeds to step S4. Moreover, when evaluation value was not judged to be reasonable, processing operation proceeds to step S5. In this way, at step S3, similarity between set block and search block within search range is evaluated with high accuracy. Then, at step S4, registration of pixel address in which matching has been established is carried out.

At step S5, judgment as to whether or not matching processing with respect to all "candidates" in this picture have been carried out is made. When judgments of all "candidates" are not yet completed (No), processing operation returns to step S1. When judgments with respect to all candidates have been completed (Yes), processing of picture coincidence is completed.

Since HD picture corresponding to SD picture is determined by the picture coincidence processing, it is possible to use output result of the picture coincidence detecting apparatus so as to up-convert, e.g., SD picture into HD picture on the basis of the above-mentioned relationship. In carrying out, e.g., up-convert operation, since adaptive class selection is carried out by using candidate corresponding to level distribution of SD picture in advance by picture coincidence processing, up-convert following local property of picture can be made. Accordingly, it is possible to generate HD picture of higher accuracy as compared to interpolated picture, which is exactly the same as resolution of SD picture obtained in the conventional up-convert operation.

While the case where picture frames in vertical direction are caused to be in correspondence with each other in the above-described embodiment, there are instances where the numbers of pixels in horizontal direction are caused to be in correspondence with each other. The condition corresponding to the formulas (6), (5) at this time are expressed below in terms of the number of pixels:

$$w1 = 2 \times w2 \tag{17}$$

$$h1 < 2 \times h2 \tag{18}$$

Linear interpolation in carrying out higher accuracy block matching in this case is carried out with respect to vertical direction to generate interpolated pixels.

In addition, while block matching carries out setting in the vicinity of corresponding pixel to carry out evaluation with respect to one pixel in the above-described embodiment, such block matching is not limited to the above-described method, i.e., matching may be carried out in block or area units.

Further, when the picture coincidence detecting apparatus and the picture coincidence detecting method are applied, matching between SD picture and HD picture is carried out to replace SD picture where matching is established by HD picture, thereby making it possible to improve resolution. Moreover, in camera device which permits stereo view, the above-mentioned apparatus and method are applied to a system of allowing pictures in which, e.g., camera systems are different to correspond to each other to carry out recognition of correspondence of picture, thus making it possible to expand the range of uses for a camera device.

A picture coincidence detecting apparatus serving as the second embodiment to which this invention is applied will now be described. This picture coincidence detecting apparatus similarly comprises, as shown in FIG. 1, for example, lower accuracy picture block matching functional section 1 as lower accuracy picture coincidence detecting means, and higher accuracy picture block matching functional section 2 as block matching processing means. In this picture coincidence detecting apparatus, pre-processing section 3 is caused to absorb the difference of signal characteristic between lower accuracy picture and higher accuracy picture.

While, in this embodiment, lower accuracy picture block matching functional section 1 is similar to that of the first embodiment, higher accuracy picture block matching functional section 2 is different from that of the first embodiment.

The above-described higher accuracy picture block matching functional section 2 of the first embodiment sets a search range corresponding to a block of an arbitrary range set within SD picture in accordance with detection result of the lower accuracy block matching functional section 1, i.e., an initial address to globally search, within the search range, a block on the HD picture corresponding to a block on the SD picture to find candidate of coincidence area to further interpolate between respective pixels of SD picture and HD picture to thereby evaluate, with high accuracy, similarity between set block and block within search range. As the evaluation method, corrections of mean value and standard deviation of luminance signal levels were carried out between corresponding blocks of SD picture side and HD picture side to consider position where difference between blocks is minimum to be a candidate of probable corresponding pixel.

However, the candidate for the corresponding pixel is the pixel searched in block relatively greater than block size used at the time of interpolation matching between pixels which will be conducted later. In view of the above, it is conceivable to examine whether or not candidate pixel is candidate pixel to be subjected to matching even in the case where it is locally viewed to carry out correction of candidate position in the case where any difference takes place.

In view of this, the picture coincidence detecting apparatus of the second embodiment is adapted to allow higher accuracy picture block matching functional section 2 to carry out matching having hierarchical structure in a more practical sense to successively reduce block size to thereby allow it to become close to block size of inter-pixel interpolation matching.

Since the lower accuracy picture block matching functional section 1 carries out pixel matching of lower accuracy with respect to SD picture and HD picture in dependency upon pixel data and reference position information delivered from pre-processing section 3 in a manner similar to that of the first embodiment, its explanation is omitted. In addition, explanation of the configuration and the operation of pre-processing section 3 is also omitted.

The higher accuracy picture block matching functional section 2 sets a search range corresponding to a block of an arbitrary range set within SD picture in accordance with detection result of the lower accuracy block matching functional section 1, i.e., an initial address to globally search, within the search range, for the block on the HD picture corresponding to the block on the SD picture to find candidate of coincidence area thereafter to successively switch block size and search area to correct the candidate thereafter to interpolate between respective pixels of SD picture and HD picture to thereby evaluate, with high accuracy, similarity between the block and the search block to detect picture where coincidence is obtained. Then, the functional section 2 outputs respective pictures where coincidence has been detected with high accuracy from output terminals 6, 7.

The processing operation by which the picture coincidence detecting apparatus of the second embodiment determines respective corresponding pixels by using HD picture and SD picture will now be described with reference to the main flowchart shown in FIG. 11. With respect to the procedure in this case, the picture coincidence procedure in up-converting SD picture into HD picture will be mainly described.

Figure 5:
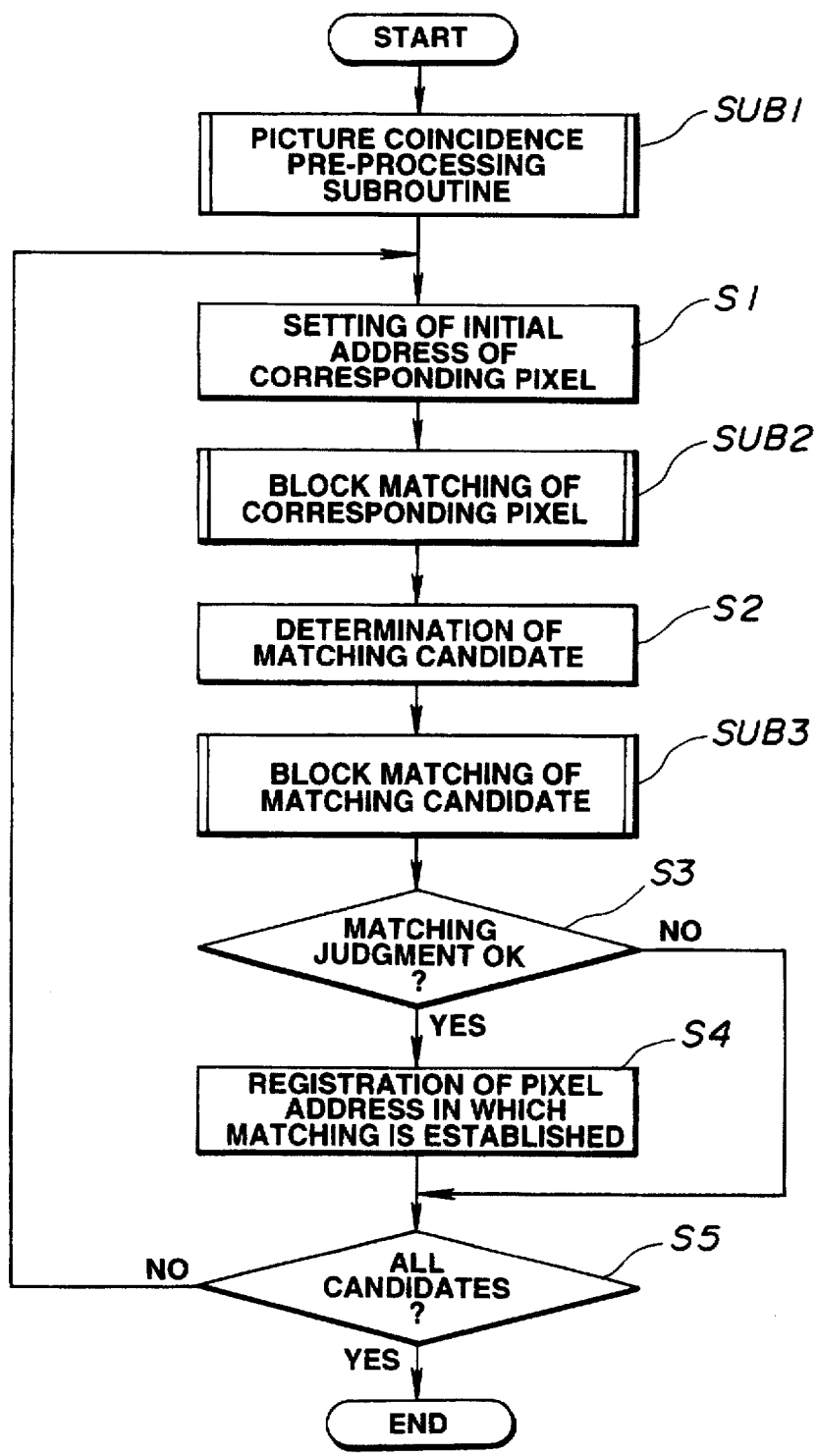
FIG. 5 is a main flowchart showing procedure for carrying out picture coincidence detection by using the picture coincidence detecting apparatus of the first embodiment of this invention.
Figure 11:
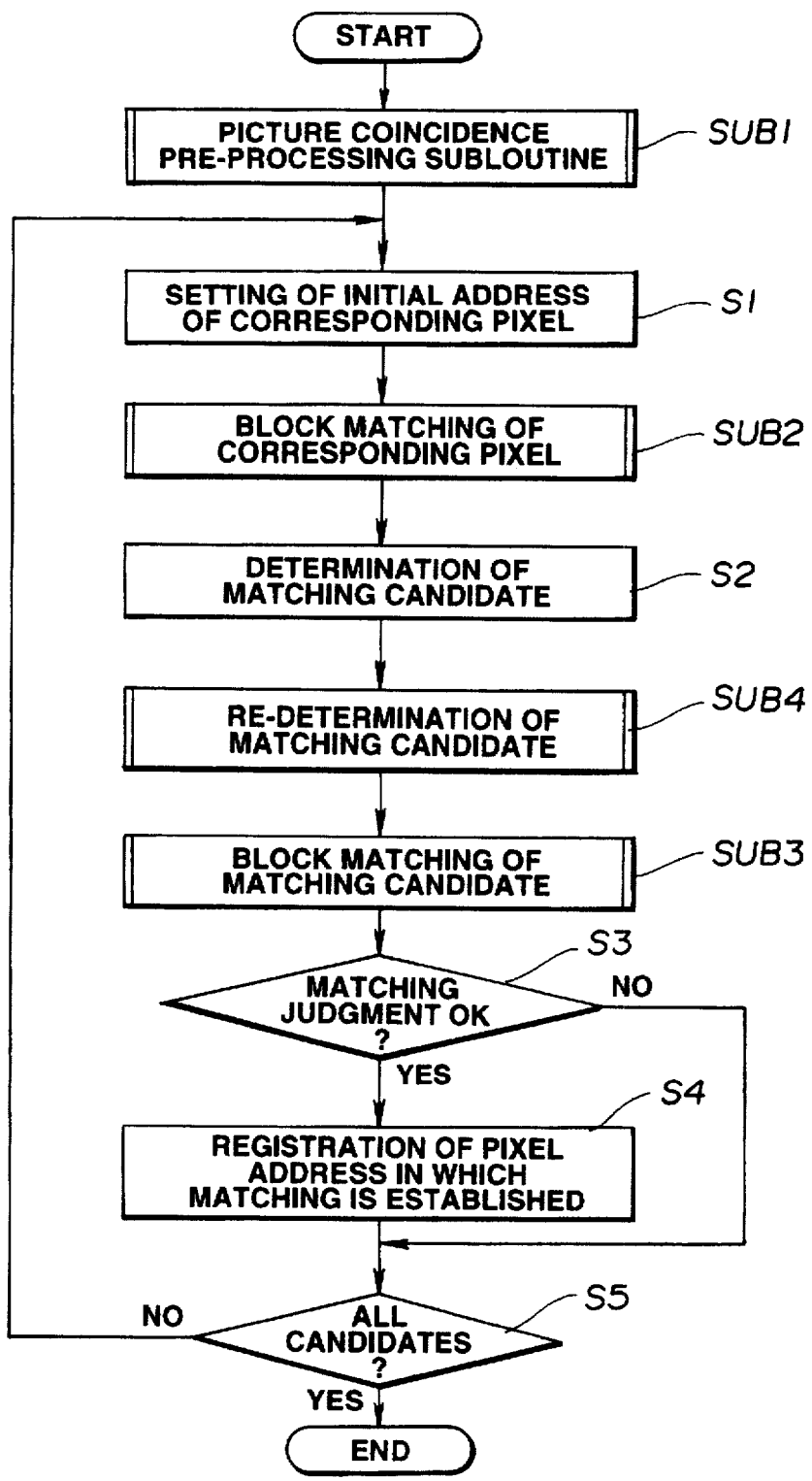
FIG. 11 is a main flowchart showing procedure for carrying out picture coincidence detection by using a picture coincidence detecting apparatus of a second embodiment of this invention.

In the flowchart shown in FIG. 11, since processing at subroutine SUB 1, step S1, subroutine SUB 2, step S2, subroutine SUB 3, step S3, step S4 and step S5 are similar to those of processing shown in FIG. 5, their explanation is omitted here. In the picture coincidence detecting apparatus of the second embodiment, processing different from the picture coincidence detecting apparatus of the first embodiment is processing procedure of subroutine SUB 4. This subroutine SUB 4 is carried out after step S2 and before SUB 3.

At the subroutine SUB 4, hierarchical matching for allowing the candidate determined at subroutine SUB 2 and step S2 to be driven into area closer to block size of pixel interpolation matching carried out in SUB 3 is carried out to re-determine the matching candidate. Namely, if any shift takes place at the position of the candidate pixel, the position of the candidate pixel is corrected thus to determine the candidate for a second time.

Figure 12:
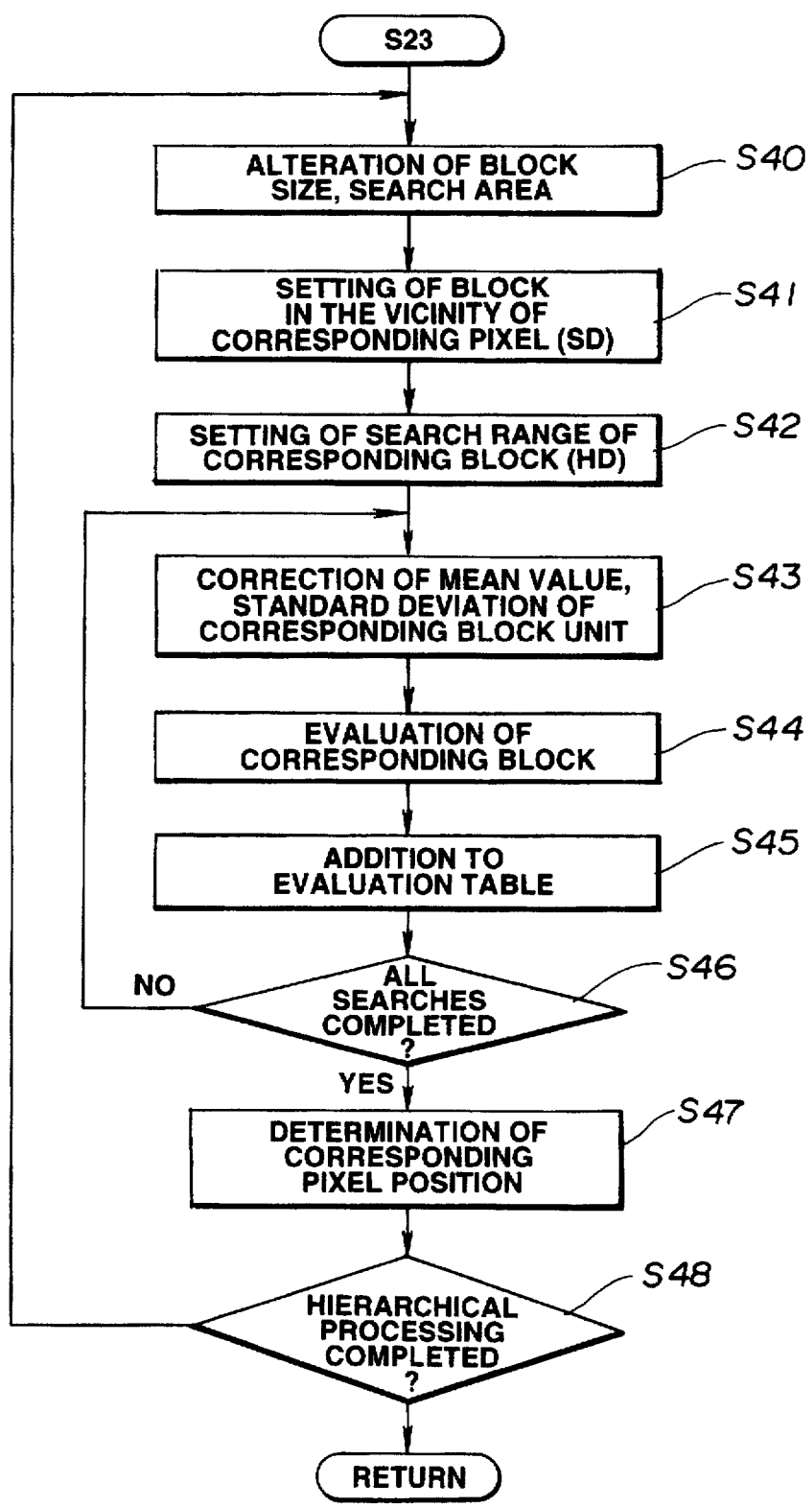
FIG. 12 is a flowchart showing procedure of subroutine SUB4 in the main flowchart shown in FIG. 11.

The processing procedure for re-determination of the matching candidate carried out in SUB 4 will now be described with reference to the flowchart of FIG. 12. In FIG. 12, at step S40, alternations (changes) of setting of block size and search area are carried out. Setting is made such that as rank becomes higher, the block size and the search area become smaller. This is because there is the necessity of allowing block size to be driven from larger block in to size of local block closer to pixel matching. If correspondence between blocks can be taken by successively reducing blocks, search area can be also reduced.

Then, at step S41, a pixel on the center axis $M_{cv}$ of FIG. 6 is defined as the corresponding pixel to set, with this corresponding pixel as center, blocks in the vicinity thereof on SD picture. Also as is clear from FIG. 6, phase shifts in horizontal direction of SD pixels and HD pixels in the vicinity of the corresponding pixel are very small. For this reason, the influence of picture angles of respective pixels, i.e., aspect ratios of SD picture and HD picture can be disregarded. Accordingly, a block provided on the HD picture is caused to have block configuration in which pixels are taken every other sample. Size of this block is caused to be successively reduced as described above.

Then, at steps S42, setting of search range of corresponding block on HD picture is carried out.

At step S43, mean value (offset) and standard deviation (gain) of luminance signal levels are caused to undergo correction processing in block units between block of the SD picture side and search block of the HD picture side set at steps S41, S42.

At step S44, evaluation is carried out, with block of the SD picture side and block within search range of the HD picture side as the corresponding block, between both blocks thereof, on the basis of the result at the above-described step S43. Evaluation function NCCF (i, j) for carrying out block matching is expressed by the above-mentioned formula (9). Moreover, the function expressed by the above-mentioned formula (10) or (11) may be used as the evaluation function.

By setting the block determined at step S44 in this way as the "candidate", block matching processing is carried out, thus making it possible to extract the position where the difference between blocks is minimum as the probable pixel.

At step S45, an evaluation value calculated every search is added to evaluation memory which is memory for evaluation. When searches are all completed, an optimum evaluation value is selected by making reference to an evaluation value table to determine an address of a candidate pixel.

At step S46, selection as to whether processing of the number of ranks set in advance or more is repeatedly carried out or processing is completed is carried out.

Then, every time the hierarchical loop is repeated, the optimum evaluation value is selected from the evaluation value table at step S47 to update that pixel position if it is different from the position at the previous rank.

Judgment of step S48 for carrying out the above-mentioned processing by set number of ranks is carried out.

Figure 13:
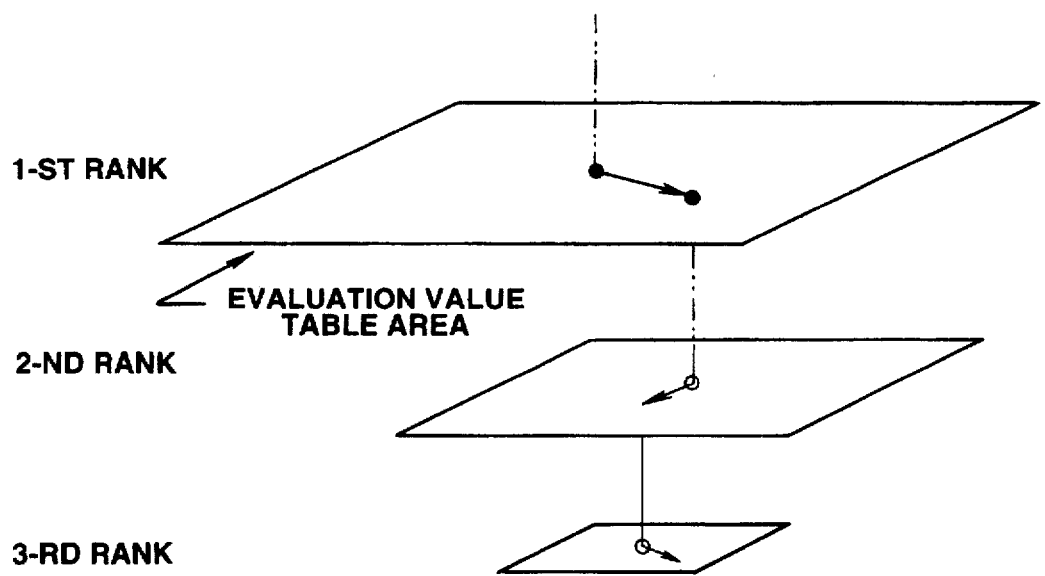
FIG. 13 is a view showing evaluation value table and transition of optimum position of the picture coincidence detecting apparatus of the second embodiment of this invention.

FIG. 13 shows state of area of evaluation value table and change of optimum position by taking the example where the number of ranks is 3. Optimum position is determined by evaluation value table added every rank and optimum position changes. Thus, position determined at the ultimate third rank becomes optimum position.

Accuracy of evaluation value table is improved by weighting-adding evaluation values every ranks. In this example, the evaluation value of the corresponding first rank is added to the evaluation value table of the second rank. This similarly applied to third rank and second rank. At this time, with respect to addition to evaluation value table, since there is the necessity in which corresponding evaluation value exists, setting operations of block size and search area in which such a necessity is taken into consideration are required.

For example, values of block size 13×13, search area ±4 (limit ±2) are set as the first rank; values of block size 9×9, search area ±2 (limit ±1) are set as the second rank, and values of block size 5×5, search area ±1 are set as the third rank. In the first and second ranks, evaluation value table is adapted to calculated only search area size, but to limit detectable range to thereby permit addition every rank. In respective ranks, optimum position is determined within limited search. Moreover, weighting addition of evaluation value tables is expressed as follows:

$$EST_0 = w_1 \cdot EST_1 + w_2 \cdot EST_2 + W_3 \cdot EST_3 \quad (19)$$

In the above formula, i=1, 2, 3 indicates the number of ranks, and w indicates weight.

When processing according to the matching candidate re-determination at the subroutine SUB 4 is completed, the processing operation proceeds to subroutine SUB 3 shown in FIG. 11 thereafter to proceed to step S3, step S4 and step S5.

To realize this, the picture coincidence detecting apparatus of the second embodiment carries out re-determination processing of a matching candidate as indicated by subroutine SUB 4 to introduce hierarchical matching so that it acts as an intermediary with respect to the difference between block sizes of global matching and subpixel matching by interpolation, whereby in the case where there takes place a difference of corresponding block by difference of block size, it is possible to correct corresponding pixel position. In addition, evaluation of the hierarchical structure is mathematically carried out, thereby making it possible to improve accuracy.

Moreover, the picture coincidence detecting apparatus which is the second embodiment can also carry out matching processing in block or area units.

Further, when picture coincidence detecting method carried out in the second embodiment is applied, matching between SD picture and HD picture is carried out to replace SD picture where matching is taken by HD picture, thereby making it possible to improve resolution. In addition, in camera devices which permit stereo view, this method is applied to correspondence between pictures in which, e.g., camera systems are different to carry out recognition of correspondence of picture, thus making it possible to expand the range of uses for a camera device.

A picture coincidence detecting apparatus serving as a third embodiment to which this invention is applied will now be described. This picture coincidence detecting apparatus comprises, as shown in FIG. 1, for example, lower accuracy picture block matching functional section 1 as lower accuracy picture coincidence detecting means, and higher accuracy picture block matching functional section 2 as block matching processing means. In addition, this picture coincidence detecting apparatus allows pre-processing section 3 to absorb difference of signal characteristic between lower accuracy picture and higher accuracy picture.

Here, the lower accuracy picture block matching functional section 1 is similar to that of the first and second embodiments, but higher accuracy picture block matching functional section 2 is different from that of the first or second embodiment.

The above-described higher accuracy picture block matching functional section 2 of the second embodiment further determines, in the case of taking matching between pictures of different resolutions, corresponding pixel by hierarchical matching from candidate pixel globally searched. At this time, when the fact that resolution is different is taken into consideration, judgment as to whether matching is established in pixel units was carried out by allowing accuracy to fall within the range of accuracy below pixel so that accuracy is ensured.

However; since matching is taken in pixel units, picture data is apt to undergo influence of disturbance such as noise, etc. As a result, since data less than pixel between pixels swung by noise is determined by pixel directly affected by noise, there is the possibility that matching judgment becomes difficult.

Moreover, since matching condition with accuracy less than pixel is considerably severe condition, matching rate which is ratio indicating that matching is established with respect to all pixels caused to undergo matching would be considerably lower value of about 4%. If matching ratio is low, since the number of data necessary for grasping tendency of matching pixel is increased, there is the possibility that it takes much time for processing.

Moreover, compensation of mean value (offset) and standard deviation (gain) of luminance signal levels in the hierarchical matching is carried out every both blocks in carrying out evaluation of matching. If picture shape is changed to much degree when block size is reduced, there is the possibility that degree of compensation may depend upon block size or picture shape.

In view of the above, the picture coincidence detecting apparatus of the third embodiment aims at devising constraints at matching section without carrying out matching less than pixel (sub pixel) to improve matching rate without damaging accuracy of matching.

Figure 14A:
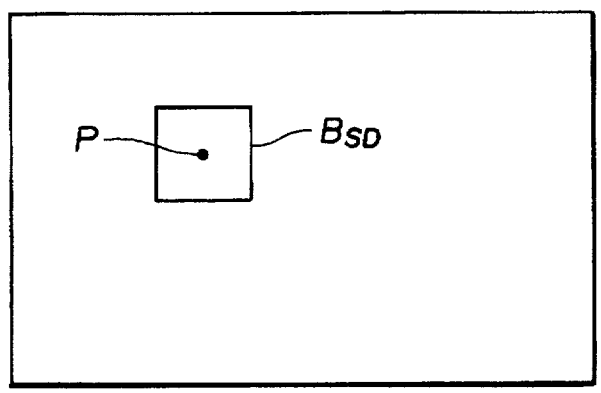
FIGS. 14A and 14B are a view for explaining matching between pictures of different resolutions.
Figure 14B:
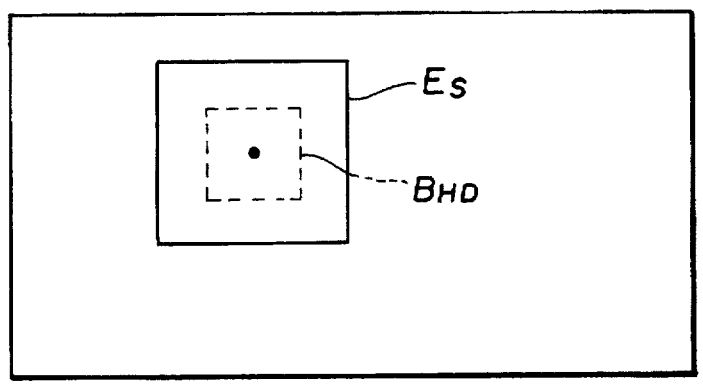

Initially, the meaning of matching of different resolution will be described with reference to FIG. 14. In SD picture shown in (a) of FIG. 14, block $B_{SD}$ having corresponding pixel P serving as initial address as center is set. In HD picture shown in (b) of FIG. 14, search range (search area) $E_s$ is set. Then, matching is determined between block $B_{SD}$ and search block $B_{HD}$ within search area $E_s$.

Figure 15:
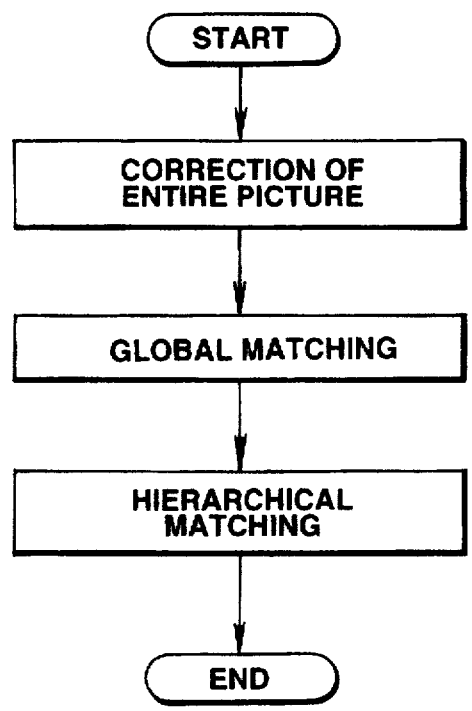
FIG. 15 is a view showing configuration of matching.

As the matching method, as shown in FIG. 15, there was employed a method of carrying out correction with respect to the entire picture thereafter to carry out global matching to allow pixel which provides optimum evaluation as candidate pixel to carry out hierarchical matching for determining matching in area closer to the candidate pixel to judge matching of candidate pixel.

In global matching carried out in this matching method, setting of initial address of corresponding pixel in which pixel aspect is taken into consideration was carried out to search optimum pixel by search loop, and correlative coefficients were used for evaluation, i.e., judgment condition of matching.

In the third embodiment, the judgment method of matching in the global matching is caused to be a method in which three judgments are added in addition to correlative evaluation using the correlation coefficients. These three judgments are correlative value judgment, gain judgment and table shape judgment.

Figure 16:
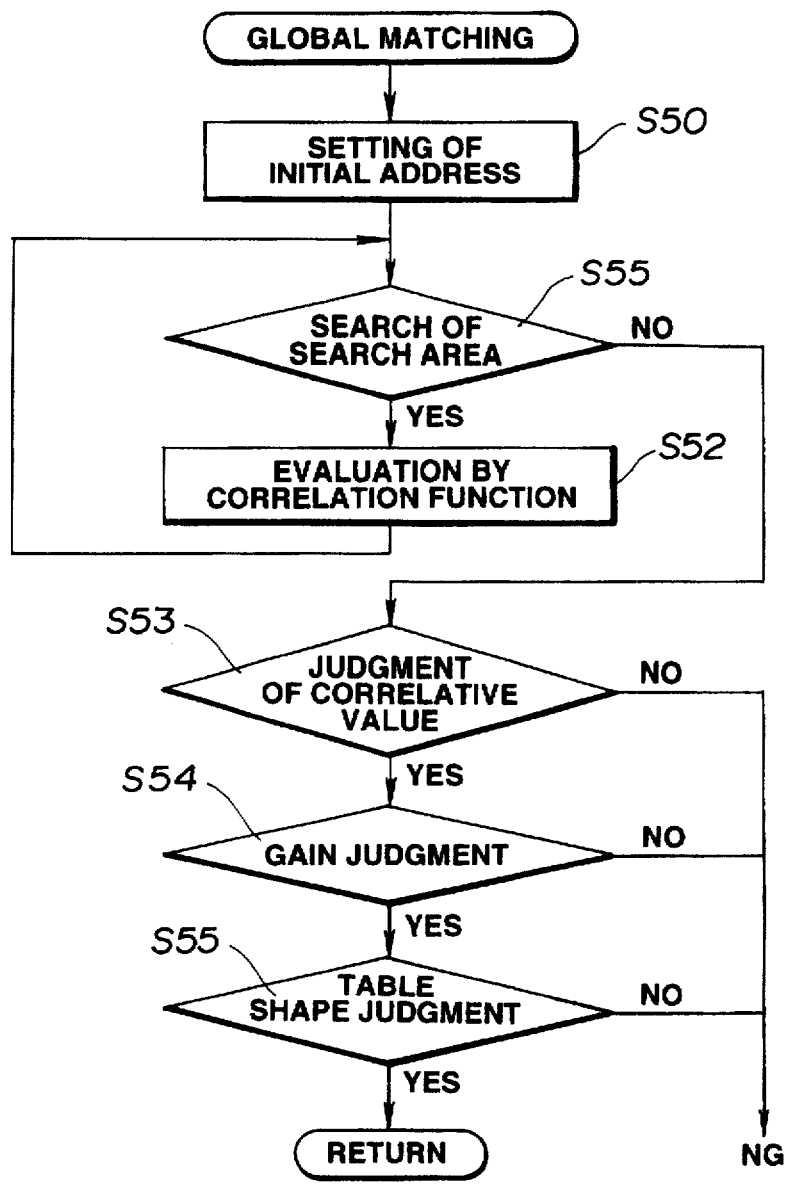
FIG. 16 is a flowchart procedure of global matching processing that a picture coincidence detecting apparatus of a third embodiment of this invention carries out.

Flow of processing of global matching in which three judgments are added will now be described with reference to the flowchart of FIG. 16.

Initially, the picture coincidence detecting apparatus of the third embodiment allows lower accuracy picture block matching functional section 1 to set an initial address as shown in step S50. Thereafter, at step S51, higher accuracy picture block matching functional section 2 is caused to set block comprised of an arbitrary range within SD picture on the basis of the initial address to allow it to set search range for searching the block and further search block on HD picture to allow it to globally search the block of the arbitrary range and the search block to judge whether or not any candidate which serves as candidate of correspondence area exist. In practice, such judgment is carried out after allowing mean value (offset) and standard deviation (gain) of luminance signal levels to undergo correction processing in block units between blocks of the SD picture side and blocks of the HD pixel side.

Then, at step S52, on the basis of the result that candidate has been found by search of search area at step S51, there is carried out judgment as to whether matching occurs between block of SD picture side and search block within search range of HD picture side. This judgment is carried out by correlative evaluation carried out by using correlation function between blocks. When judgment at step S52 is completed, processing operation returns to step S51.

In the case where candidate of coincidence area is not found as the result of search of search area at step S51, i.e., matching is not found between blocks of the SD picture side and search block within search range of the HD picture side, processing operation proceeds to judgment step S53. This step S53 is a step such that when correlation coefficient which is evaluation value at step S52 is too small, even if corresponding value is optimum value within search area, it is judged that matching is not found. When optimum correlation value is Rs, matching condition is expressed below:

$$R_s > TH_r \quad (20)$$

In the above formula $TH_r$ is threshold value.

In the above formula (20), when optimum correlation value $R_s$ is greater than $TH_g$, the processing operation proceeds to step S54. At this step S54, when gain of block which has taken matching at optimum position, i.e., rate of standard deviation is too great, it is judged that matching is not established. If respective standard deviations are $\sigma_{sd}$, $\sigma_{hd}$, in the case of $\sigma_{hd} > \sigma_{sd}$ the matching condition is expressed below:

$$\sigma_{hd}/\sigma_{sd} > TH_g \quad (21)$$

Moreover, in the case of $\sigma_{sd} > \sigma_{hd}$ $$\sigma_{sd}/\sigma_{hd} > TH_g \quad (22)$$

In the above formula $TH_g$ is predetermined threshold value.

In the case where the matching condition is satisfied, processing operation proceeds to step S55. At this step S55, shape of evaluation value table when search is conducted is judged to judge that matching is more correct according as shape becomes more sharp in a single peak. The matching condition is that when ratio with respect to optimum evaluation value is r, threshold value expressed below is determined.

$$TH_1 = r \times R_s \quad (23)$$

With respect to evaluation value, the evaluation value R on the table satisfies the following formula, $$R > TH_1 \quad (24)$$

norm of position ($X_s$, $Y_s$) of optimum evaluation value is in turn integrated. Namely, when the position of the evaluation value is ($x_i$, $y_i$), norm $N_r$ is expressed as follows:

$$N_l = \frac{1}{n} \sum_{i=1}^{n} \sqrt{(x_i - x_s)^2 + (y_i - y_s)^2} \quad (25)$$

In the above formula, n is a number which satisfies the formula (24).

Here, since as $N_r$ becomes smaller, the shape of the table can be judged to be more sharp, the matching condition is expressed as follows:

$$N_r < TH_2 \quad (26)$$

In the above formula, $TH_2$ is threshold value.

Another embodiment for judging the shape of the evaluation value table will now be described below. Namely, in place of determining norm of the formula (25), when the position of the evaluation value which satisfies the formula (24) and is remotest from ($x_s$, $Y_s$) is ($X_f$, $y_f$), $D_s$ is determined by the following formula:

$$D_s = \sqrt{(X_f - X_s)^2 + (Y_f - Y_s)^2} \quad (27)$$

Since there is a tendency such that as $D_2$ becomes smaller, the shape becomes more sharp, a matching condition is defined as follows:

$$r/D_s > TH_3 \quad (28)$$

In the above formula, $TH_3$ is threshold value.

Moreover, when the standard deviation $\sigma_R$ of evaluation value R which satisfies the formula (24) is determined, since as the standard deviation becomes smaller, the shape is judged to be more sharp, a matching condition is expressed as follows:

$$\sigma_R < TH_4 \quad (29)$$

The pixel in which it is judged that matching has been established by the above-mentioned judgment is delivered to hierarchical matching of the succeeding stage.

Hierarchical matching allows a block to be driven into (become closer to) a value in the vicinity of the pixel while reducing the block size to mathematically judge optimum position in respective ranks to judge whether or not matching is ultimately established. Particularly, hierarchical matching of the picture coincidence detecting apparatus of the third embodiment differs from the hierarchical matching processing of the above-described picture coincidence detecting apparatus of the second embodiment in that compensation by steady state offset (mean value of levels of luminance signals) and gain (standard deviation of luminance signals) is added. In the picture coincidence detecting apparatus of the second embodiment, compensation was carried out every both blocks in carrying out evaluation of matching, but there was the possibility that when picture shape changes to much degree in the case where block size is reduced, degree of compensation may depend upon block size or picture shape. For this reason, steady state value which does not greatly depend upon block size or picture shape is determined.

Figure 17:
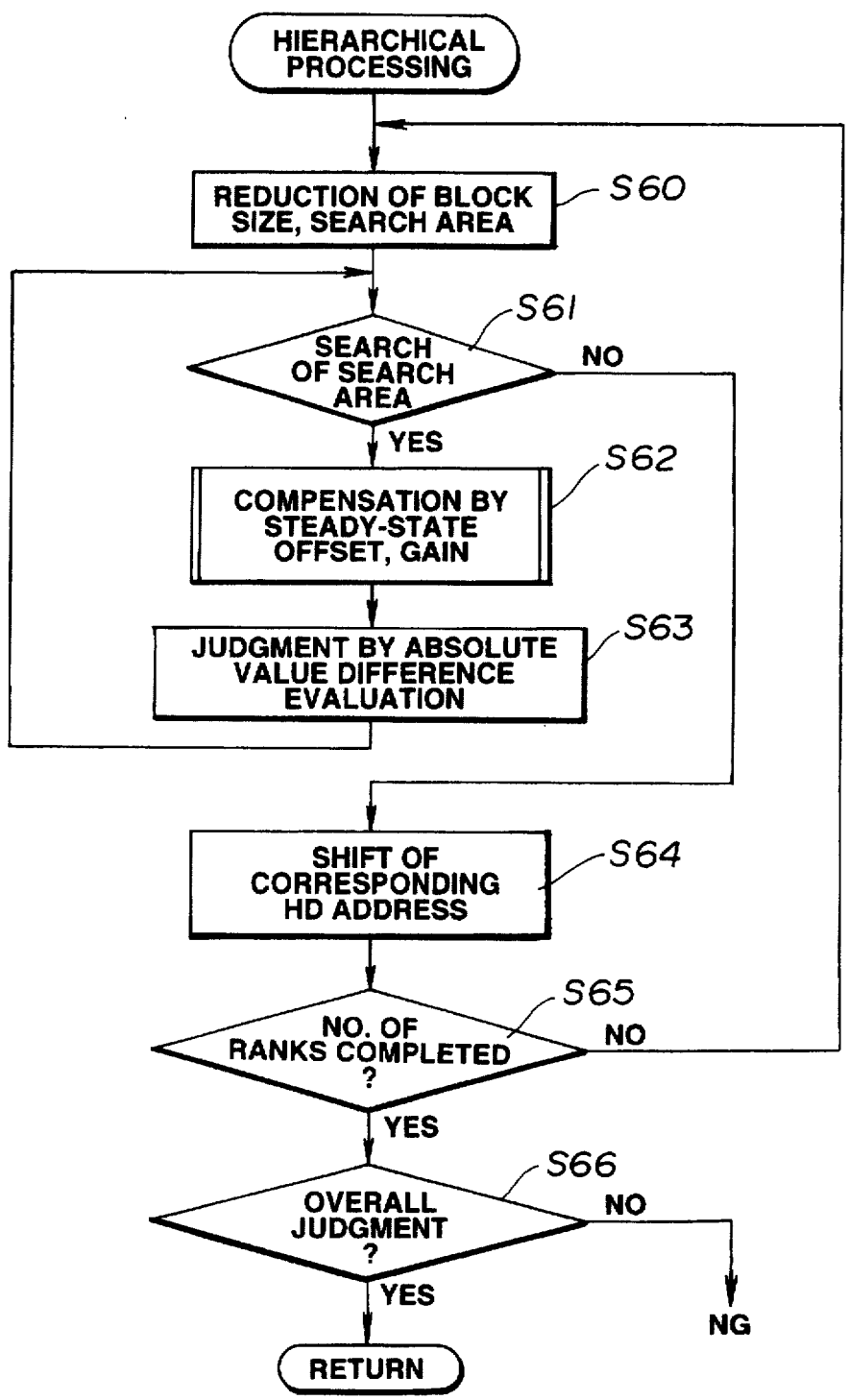
FIG. 17 is a flowchart showing procedure of resolution matching processing that the picture coincidence detecting apparatus of the third embodiment of this invention carries out.

Flow of hierarchical matching processing in which compensation by steady state offset and gain is added will now be described with reference to the flowchart of FIG. 17.

Higher accuracy picture block matching functional section 2 reduces block size and search area at step S60. Degree of reduction becomes greater as rank become higher. This is because there is the necessity of allowing block size to fall within the range of size of local block closer to pixel matching from large block. If blocks are caused to correspond to each other by successively reducing size, search area can be reduced.

Then, higher accuracy picture block matching functional section 2 searches a search area at step S61 to judge whether there exists a corresponding block serving as a coincidence area. If a corresponding block is judged to be present, the processing operation proceeds to step S62. If a corresponding block is judged to be absent, the processing operation proceeds to step S64

Figure 18A:
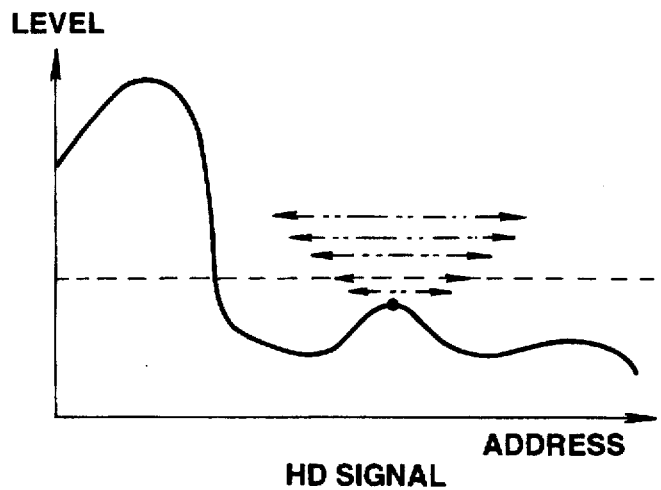
FIGS. 18A and 18B are a view showing an example of picture signal conversion.
Figure 18B:
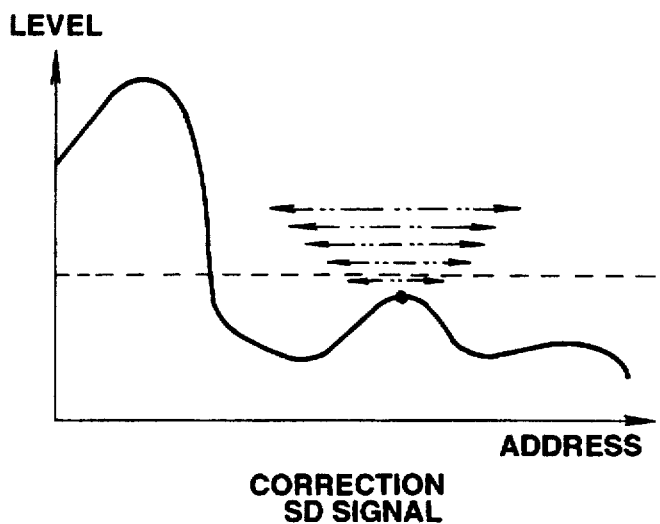
Figure 19A:
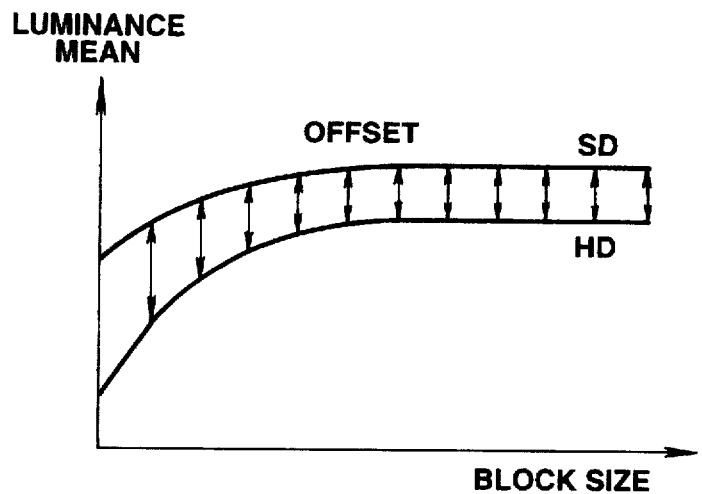
FIGS. 19A and 19B are a view showing examples of changes of offset and gain.
Figure 19B:
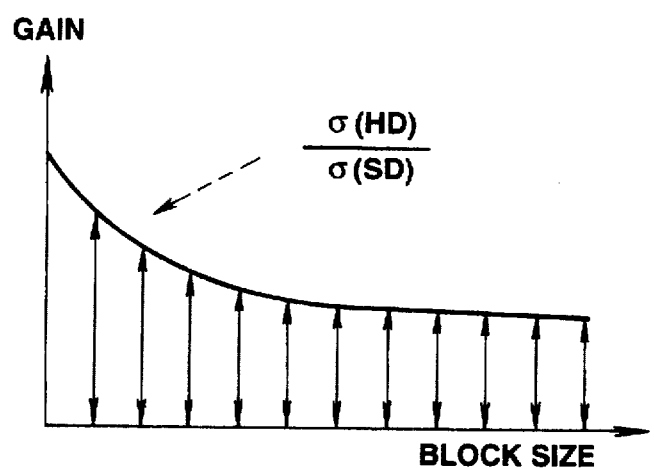

At step S62, compensation by steady state offset and gain as described above is carried out. FIGS. 18(a) and (b) are examples wherein changes of respective signals are one-dimensionally indicated for brevity. When block size is caused to be greater with pixel of remark (black point) as center, luminance levels within respective blocks are assumed to be varied as indicated by (a) and (b) of FIG. 19. Offset 0 is defined by difference between respective luminance mean values as follows:

$$O = M_{hd} - M_{sd} \quad (30)$$

When offset at each block size is assumed to be $O_u$, judgment of the steady state is as follows:

$$|O_u - O_{u-1}| < TH_m \quad (31)$$

In the above formula, u is block size greater than u−1. When N number of offset values which satisfy the above-mentioned formula (12) are continuation, this state is judged to be in steady state, and steady state value of at that time is determined by mean of continuous N offset values as follows:

$$O_f = \frac{1}{N} \sum_{u=1}^{n} O_u \quad (32)$$

Gain is the ratio between standard deviations of luminance levels within respective blocks, and is defined as follows:

$$G = \sigma_{nd}/\sigma_{sd} \quad (33)$$

For this reason, when gain at each block size is assumed to be $G_V$, $$|G_v - G_{v-1}| < TH_s \quad (34)$$

when N number of gains which satisfies the above formula are continuous, this state is judged to be steady state. In the above formula, $TH3_s$ is threshold value, and v is block size greater than v−1.

Steady state value $G_f$ at that time can be similarly determined by the following formula:

$$G_f = \frac{1}{N} \sum_{v=1}^{n} G_v \quad (35)$$

Steady state values of offset and gain obtained in this way are used to carry out compensation at the time of search of matching. This compensation is to allow luminance mean and standard deviation of the lower resolution side to be in correspondence with that of the higher resolution side in carrying out the matching evaluation between a block of the lower resolution side and a block within the search area of the higher resolution side. When respective luminance values are designated at $Y_{sd}$, $Y_{hd}$, $$Y_{sd} = (Y_{hd} - Y_{sd})G_f + M_{sd} + O_f \quad (36)$$

the above-mentioned compensation is carried out by the above formula. By carrying out such compensation, it is possible to conduct matching judgment of higher accuracy without depending upon block size or picture shape.

Then, the processing operation proceeds to step S63 to carry out judgment by absolute value difference evaluation thereafter to return to step S61.

At step S64, the evaluation value calculated every search is added to the memory value of evaluation memory which is memory for evaluation. When search operations are all completed, an optimum evaluation value is selected by making reference to the evaluation value table to determine an address of the candidate pixel. Namely, at step S64, the corresponding HD address is shifted.

Here, every time the hierarchical loop is repeated, an optimum evaluation value is selected from the evaluation value table to update that pixel position if it is different from that at the previous rank.

Then, in order to carry out the above-mentioned processing by the set number of ranks, judgment of step S65 is carried out. Here, in the case where processing operation proceeds to the next rank, reduction of setting of block size and search area is carried out at step S60 as described above.

Finally, overall judgment is carried out at step S66. Thus, matching processing of higher accuracy picture block matching functional section 2 is completed.

As described above, the picture coincidence detecting apparatus of the third embodiment successively carries out, in the case of taking matching of different resolutions, global matching and hierarchical matching while giving constraints thereto to thereby permit ensuring of accuracy of matching. In this case, since matching below pixel (sub pixel) is not carried out, rate of matching can be improved.

In addition, since compensation of offset and gain in hierarchical matching is carried out by steady state value, matching in this case is difficult to depend upon block size or picture shape.

What is claimed is:

1. A picture coincidence detecting apparatus adapted for detecting coincidence relationship between respective pixels of a first picture that a first image pick-up element comprised of a first number of pixels outputs and a second picture that a second image pick-up element comprised of a second number of pixels outputs, the apparatus comprising:

lower accuracy picture coincidence detecting means for carrying out lower accuracy pixel matching on the basis of reference positions of the first and second pictures; and block matching processing means for selectively carrying out block matching processing in pixel or subpixel units to set, on the second picture, a search range corresponding to a block on the first picture in dependency upon a detection result of the lower accuracy picture coincidence detecting means to search a block on the second picture, which matches with the block on the first picture, wherein when the first picture is assumed to be a lower resolution picture and the second picture is assumed to be a higher resolution picture, the block matching processing means sets, on the higher resolution picture, a search range corresponding to the block on the lower resolution picture in dependency upon a detection result of the lower accuracy picture coincidence detecting means to globally search, within the search range, a block on the higher resolution picture, which matches with the block on the lower resolution picture to find a candidate to further interpolate between respective pixels of the lower resolution picture and the higher resolution picture to thereby evaluate similarity between the set block and the block within the search range to detect a picture in which coincidence is established.

2. A picture coincidence detecting apparatus adapted for detecting coincidence relationship between respective pixels of a first picture that a first image pick-up element comprised of a first number of pixels outputs and a second picture that a second image pick-up element comprised of a second number of pixels outputs, the apparatus comprising:

lower accuracy picture coincidence detecting means for carrying out lower accuracy pixel matching on the basis of reference positions of the first and second pictures; and block matching processing means for globally searching, within a search range set on the second picture, the first and second pictures in dependency upon a detection result of the lower accuracy picture coincidence detecting means to select respective points of remark to set corresponding blocks including these points of remark in the first and second pictures to make a correction such that mean values or standard deviations of these luminance signals are in correspondence with each other thereafter to selectively implement block matching processing in pixel or subpixel units to the corresponding blocks, wherein the block matching processing means repeats, n number of times, while hierarchically reducing n number of times the corresponding block, detection and correction of a difference between mean levels of luminance signals or the detection and correction of a ratio between standard deviations of luminance signals, and block matching processing.

3. A picture coincidence detecting method of detecting coincidence between respective still pictures imaged by cameras having different resolutions, said method comprising the steps of:

setting a block of a predetermined size within a lower resolution picture, setting a search range corresponding to the block on a higher resolution picture, globally searching the search range to find a candidate, and block coincidence detecting by interpolating between respective pixels of the higher resolution picture and the lower resolution picture to selectively evaluate in pixel or subpixel units, with high accuracy, similarity between the set block and a block within the search range to detect a picture in which coincidence is established, said block coincidence detecting step including the step of allowing mean values or standard deviations of luminance signal levels of a higher resolution picture and a lower resolution picture to coincide with each other over the entire picture prior to carrying out the picture coincidence detecting processing to allow the mean values or standard deviations of luminance signal levels to coincide with each other in local corresponding block units for a second time in carrying out coincidence detection of block unit.

4. A picture coincidence detecting method of detecting coincidence between respective still pictures imaged by cameras having different resolutions, the method comprising the steps of:

setting a block of a predetermined size within a lower resolution picture;

setting a search range corresponding to the block on the higher resolution picture;

globally searching the search range to find a candidate: and block coincidence detecting by setting a corresponding block including a candidate in pictures of lower resolution and higher resolution to make a correction such that mean levels or standard deviations of luminance signals are in correspondence with each other thereafter to selectively evaluate in pixel or subpixel units, with high accuracy, similarity between the corresponding blocks to detect a picture in which coincidence is established wherein the block coincidence detecting step repeats, n number of times, detection and correction of a difference between mean values of luminance signals or detection and correction of a ratio between standard deviations of luminance signals, and block matching processing the corresponding block.

5. A picture coincidence detecting method of detecting coincidence between respective still pictures imaged by cameras having different resolutions, the method comprising the steps of:

setting a block of a predetermined size within a lower resolution picture;

setting a search range corresponding to the block on a higher resolution picture;

globally searching the search range to find a candidate; and block coincidence detecting by respectively setting corresponding blocks including the candidate to determine a difference between mean values or a ratio between standard deviations of luminance signals of a block within the lower resolution picture and a block within the higher resolution picture while allowing the corresponding blocks to be greater in a stepwise manner to successively selectively implement matching processing in pixel or subpixel units from larger blocks to smaller blocks of hierarchical plural blocks by using the difference or the ratio when the determined difference or ratio converges to detect a picture in which coincidences established wherein the block coincidence detecting step generates, by interpolation data between respective pixels of the first and second pictures to respectively set corresponding blocks including the candidate.

6. A picture coincidence detecting apparatus as set forth in claim 1, wherein the block matching processing means generates, by interpolation, data between respective pixels of the first and second pictures thereafter to carry out the block matching processing.

7. A picture coincidence detecting apparatus as set forth in claim 1, wherein the first and second image pick-up elements image the same object.

8. A picture coincidence detecting apparatus as set forth in claim 7, wherein a marker indicating a pixel position of reference is attached to the object.

9. A picture coincidence detecting apparatus as set forth in claim 2, wherein the block matching processing means generates, by interpolation, data between respective pixels of the first and second pictures thereafter to carry out the block matching processing.

10. A picture coincidence detecting apparatus as set forth in claim 2, wherein the first and second image pick-up elements image the same object.

11. A picture coincidence detecting apparatus as set forth in claim 10, wherein a marker indicating a pixel position of reference is attached to the object.

12. A picture coincidence detecting method as set forth in claim 3, wherein, in the block coincidence detecting step, as a method of evaluating similarity between blocks of higher resolution picture and lower resolution picture, correlative coefficients between blocks are used to carry out evaluation.

13. A picture coincidence detecting method as set forth in claim 3, wherein, in the block coincidence detecting step, as a method of evaluating similarity between blocks of higher resolution picture and lower resolution picture, absolute value sum of differences between blocks is used to carry out evaluation.

14. A picture coincidence detecting method as set forth in claim 3, wherein, in the block coincidence detecting step, as a method of evaluating similarity between blocks of higher resolution picture and lower resolution picture, square sum of differences between blocks is used to carry out evaluation.

15. A picture coincidence detecting method as set forth in claim 4, wherein the block coincidence detecting step mathematically judges evaluation values in matching every rank to correct a matching candidate pixel.

16. A picture coincidence detecting method as set forth in claim 4, wherein the block coincidence detecting step adjusts block size and search area in matching so that an evaluation value of higher rank corresponding to an evaluation object pixel position of lower rank exists when evaluation value of higher rank is applied to evaluation value of lower rank.

* * * * *